(12) United States Patent
Inoue et al.

(10) Patent No.: US 11,062,627 B2
(45) Date of Patent: Jul. 13, 2021

(54) TAPE, TAPE ROLL, AND TAPE CASSETTE

(71) Applicant: Brother Kogyo Kabushiki Kaisha, Nagoya (JP)

(72) Inventors: Harumitsu Inoue, Toki (JP); Haruki Matsumoto, Nagoya (JP); Takaaki Banno, Nagoya (JP); Yukiko Takami, Inazawa (JP); Yukihiko Sato, Nagoya (JP)

(73) Assignee: Brother Kogyo Kabushiki Kaisha, Nagoya (JP)

( * ) Notice: Subject to any disclaimer, the term of this patent is extended or adjusted under 35 U.S.C. 154(b) by 205 days.

(21) Appl. No.: 15/895,663

(22) Filed: Feb. 13, 2018

(65) Prior Publication Data

US 2019/0066544 A1    Feb. 28, 2019

(30) Foreign Application Priority Data

Aug. 31, 2017    (JP) .............................. JP2017-167718

(51) Int. Cl.
| | | |
|---|---|---|
| *G09G 3/10* | (2006.01) | |
| *G09F 3/10* | (2006.01) | |
| *B41J 15/04* | (2006.01) | |
| *G09F 3/02* | (2006.01) | |
| *B41J 3/407* | (2006.01) | |
| *B41J 2/335* | (2006.01) | |

(Continued)

(52) U.S. Cl.
CPC ................. *G09F 3/10* (2013.01); *B32B 7/06* (2013.01); *B41J 2/33505* (2013.01);
(Continued)

(58) Field of Classification Search
CPC .. G09F 3/18; G09F 2003/0222; B41J 2/33505
See application file for complete search history.

(56) References Cited

U.S. PATENT DOCUMENTS

| 6,134,016 A | 10/2000 | Watanabe et al. | |
|---|---|---|---|
| 6,479,118 B1 * | 11/2002 | Atkinson | ................ B65C 9/265 |
| | | | 428/40.1 |

(Continued)

FOREIGN PATENT DOCUMENTS

| CN | 1654225 A | 8/2005 |
|---|---|---|
| CN | 101142087 A | 3/2008 |

(Continued)

OTHER PUBLICATIONS

Oct. 19, 2018—(EP) Extended Search Report—App 18163171.4.
May 6, 2021—(CN) Notification of First Office Action—App 201810246533.6, Eng Tran.

*Primary Examiner* — Kristina N Junge
(74) *Attorney, Agent, or Firm* — Banner & Witcoff, Ltd.

(57) ABSTRACT

A tape includes: a sheet; first and second media arranged adjacent to each other in a longitudinal direction of the sheet, spaced from each other, and peelably stuck to the sheet; a first separating line extending between first and second ends of the sheet in a widthwise direction between the first and second media; and a second separating line formed at a portion of the sheet which is located between a center position of the second medium in the widthwise direction and a first end of the second medium in the widthwise direction. The second separating line is formed at at least a portion of the sheet which is located between first and second ends of the second medium in the longitudinal direction. Each of the first and second separating lines includes a portion formed through or cut in the sheet in a thickness direction.

15 Claims, 8 Drawing Sheets

(51) Int. Cl.
   *G09F 3/18*     (2006.01)
   *B41J 32/00*    (2006.01)
   *B41J 11/66*    (2006.01)
   *B41J 11/70*    (2006.01)
   *B32B 7/06*     (2019.01)

(52) U.S. Cl.
   CPC ........... *B41J 3/4075* (2013.01); *B41J 11/666* (2013.01); *B41J 11/703* (2013.01); *B41J 15/044* (2013.01); *B41J 32/00* (2013.01); *G09F 3/0288* (2013.01); *G09F 3/185* (2013.01); *G09F 2003/0222* (2013.01); *G09F 2003/0229* (2013.01)

(56) References Cited

U.S. PATENT DOCUMENTS

| | | | |
|---|---|---|---|
| 9,959,789 B2 * | 5/2018 | Sato | G09F 3/10 |
| 2002/0056989 A1 * | 5/2002 | Lewis-Leander | G09F 3/0288 |
| | | | 283/81 |
| 2002/0096874 A1 * | 7/2002 | Viby | G09F 3/0288 |
| | | | 283/81 |
| 2005/0180795 A1 | 8/2005 | Kurashina | |
| 2006/0008608 A1 | 1/2006 | Kurashina | |
| 2008/0276504 A1 * | 11/2008 | Cloninger | G09F 3/0288 |
| | | | 40/312 |
| 2008/0279605 A1 | 11/2008 | Yamaguchi et al. | |
| 2010/0129583 A1 | 5/2010 | Hong et al. | |

FOREIGN PATENT DOCUMENTS

| | | |
|---|---|---|
| EP | 0825541 A2 | 2/1998 |
| JP | H08-25707 A | 1/1996 |
| JP | H08-090841 A | 4/1996 |
| JP | H08-290618 A | 11/1996 |
| JP | H10-058757 A | 3/1998 |
| JP | 2006-315414 A | 11/2006 |
| JP | 2007-041016 A | 2/2007 |
| JP | 5723411 B2 | 5/2015 |

* cited by examiner

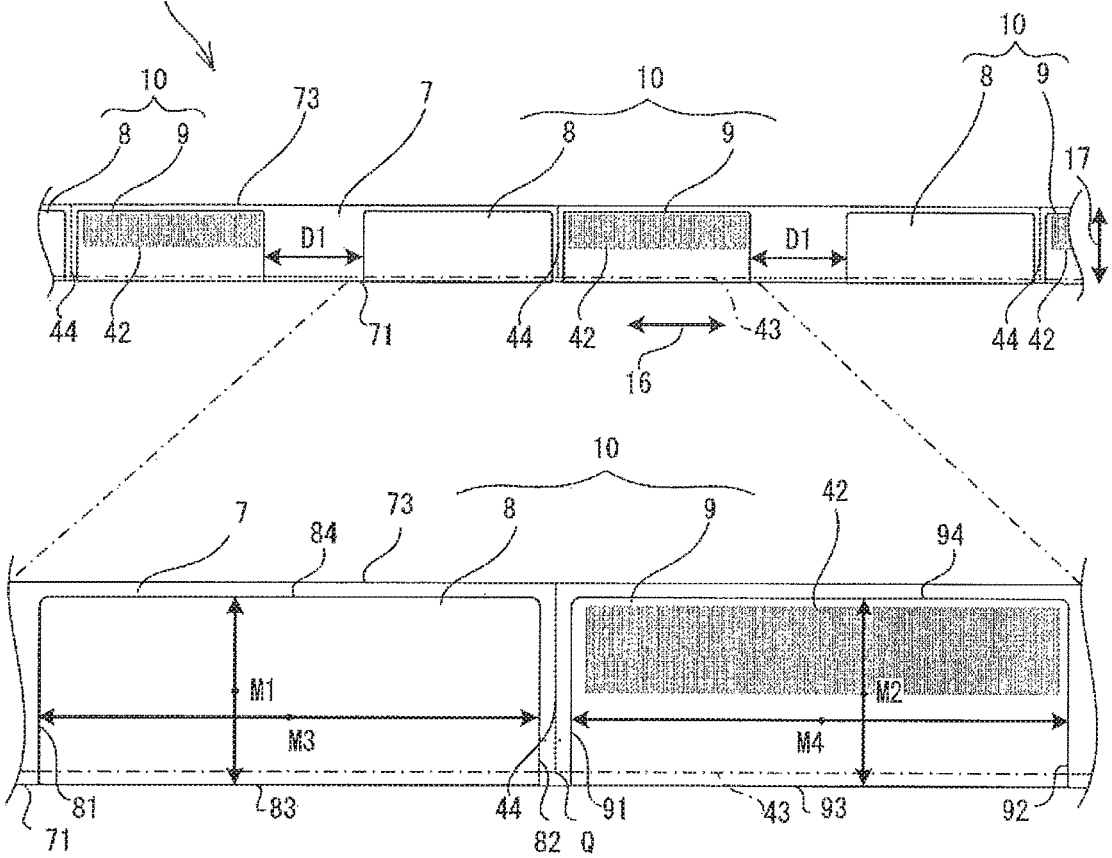
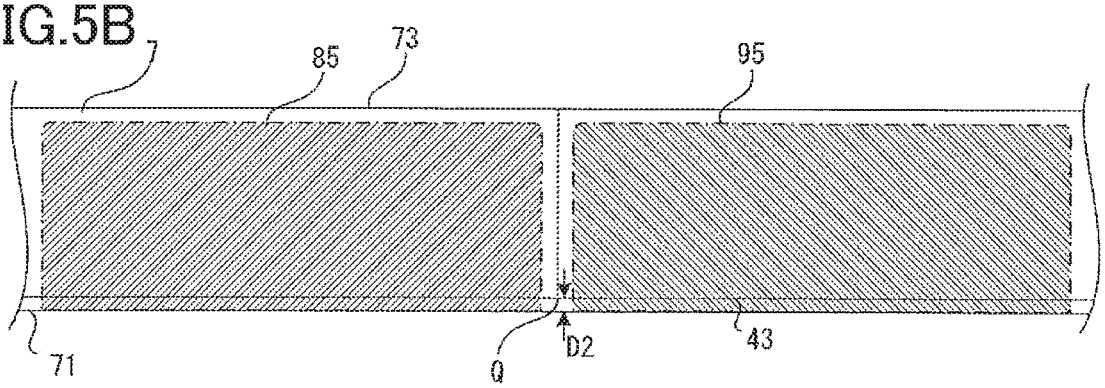
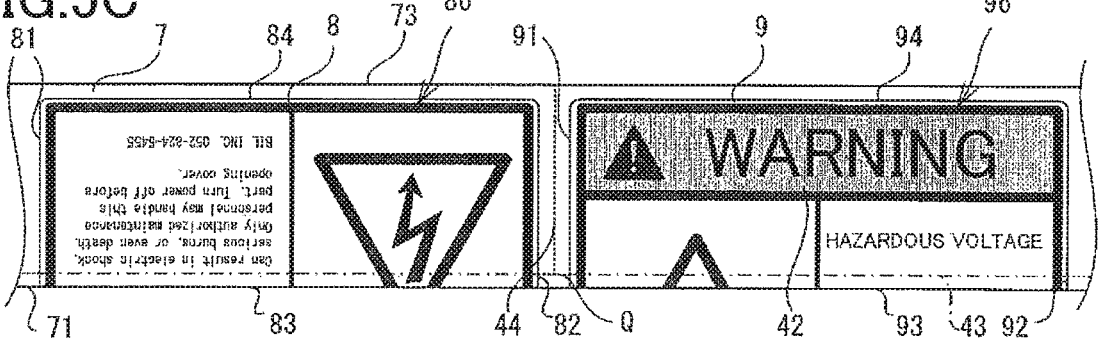

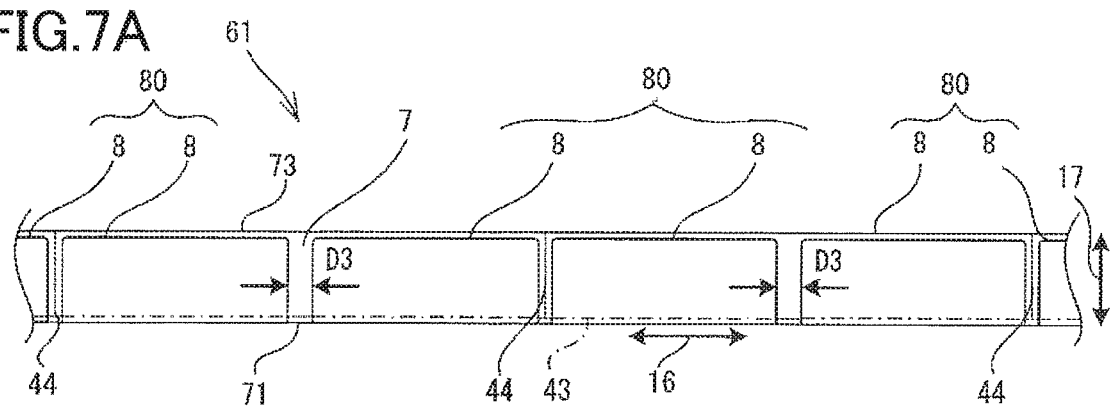
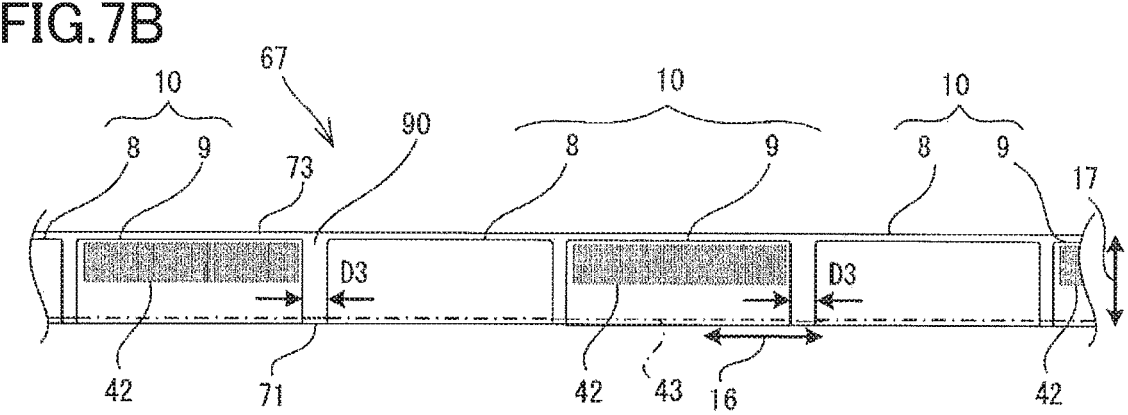
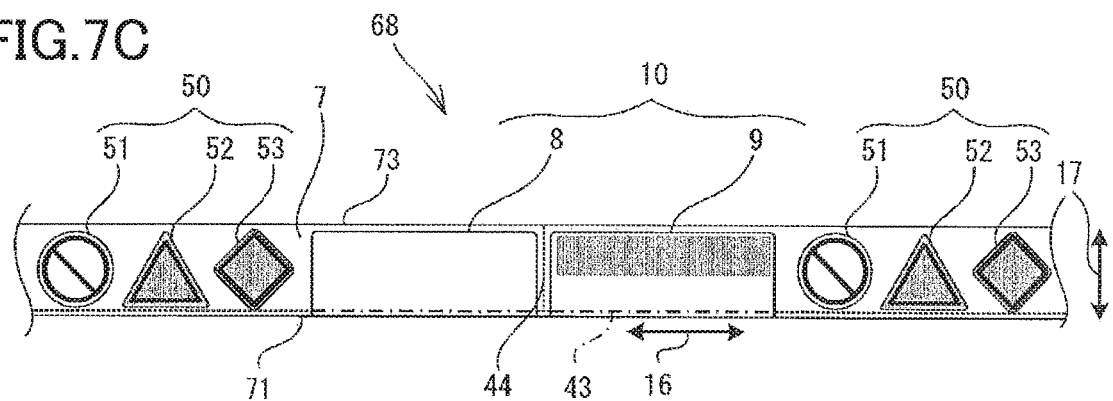
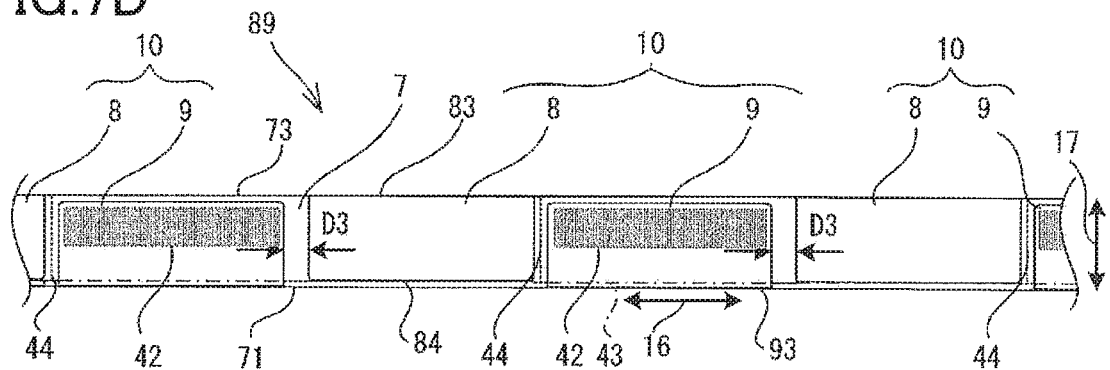

TAPE, TAPE ROLL, AND TAPE CASSETTE

CROSS REFERENCE TO RELATED APPLICATION

The present application claims priority from Japanese Patent Application No. 2017-167718, which was filed on Aug. 31, 2017, the disclosure of which is herein incorporated by reference in its entirety.

BACKGROUND

The following disclosure relates to a tape, a tape roll, and a tape cassette.

There is known a printing apparatus configured to, in a case where the printing apparatus prints on a strip-shaped tape an image having a width greater than that of the tape, split print data for image printing into a plurality of partial data and print images on a plurality of portions of the tape in its longitudinal direction based on the plurality of the created partial data. After the printing apparatus performs printing on the tape based on the plurality of the partial data, the portions of the tape which correspond to the respective partial data are stuck to each other by a user.

SUMMARY

In the case where a plurality of tapes are stuck to each other, accurate positioning is preferable. In the above-described conventional printing apparatus, when the user sticks the tapes to each other, the user needs to perform positioning of the tapes in a state in which the entire release paper is peeled off. Thus, adhesive portions of the tapes different from its sticking regions may adhere to user's hand or an object, leading to low workability in sticking.

Accordingly, an aspect of the disclosure relates to a tape, a tape roll, and a tape cassette with improved workability in sticking of a plurality of media to each other in a case where an image wider than a medium stuck to a strip-shaped sheet is split into a plurality of portions each having a width less than the width of the medium and is printed on the medium.

One aspect of the disclosure relates to a tape comprising: a sheet having a strip shape; a first medium and a second medium arranged adjacent to each other in a longitudinal direction of the sheet, the first medium and the second medium being spaced apart from each other in the longitudinal direction, the first medium and the second medium being peelably stuck to the sheet; a first separating line formed at a portion of the sheet which is located between the first medium and the second medium arranged in the longitudinal direction as a pair, the first separating line extending, in a widthwise direction orthogonal to the longitudinal direction, over at least a portion of a region extending in the widthwise direction from a first end of the sheet in the widthwise direction to a second end of the sheet in the widthwise direction, the first separating line comprising a portion formed through or cut in the sheet in a thickness direction of the sheet; and a second separating line formed at a portion of the sheet which is located in the widthwise direction between a center position of the second medium in the widthwise direction and a first end of the second medium which is nearer in the widthwise direction to the first end of the sheet in the widthwise direction than the center position of the second medium in the widthwise direction, the second separating line being formed at at least a portion of the sheet to which the second medium is stuck and which is located between a first end of the second medium in the longitudinal direction and a second end of the second medium in the longitudinal direction, the second separating line comprising a portion formed through or cut in the sheet in the thickness direction.

Another aspect of the disclosure relates to a tape, comprising: a sheet having a strip shape; a plurality of media consecutively arranged so as to be spaced apart from each other in a longitudinal direction of the sheet, the plurality of media being peelably stuck to the sheet; a first separating line formed at a portion of the sheet which is located between adjacent two media of the plurality of media, the first separating line extending, in a widthwise direction orthogonal to the longitudinal direction, over at least a portion of a region extending in the widthwise direction from a first end of the sheet in the widthwise direction to a second end of the sheet in the widthwise direction, the first separating line comprising a portion formed through or cut in the sheet in a thickness direction of the sheet; and a second separating line formed at a portion of the sheet which is located in the widthwise direction between a center position of one medium of the adjacent two media in the widthwise direction and a first end of the one medium in the widthwise direction, the second separating line being formed at at least a portion of the sheet to which the one medium is stuck and which is located between a first end of the one medium in the longitudinal direction and a second end of the one medium in the longitudinal direction, the second separating line comprising a portion formed through or cut in the sheet in the thickness direction.

Still another aspect of the disclosure relates to a tape comprising: a sheet extending in a longitudinal direction; a first medium and a second medium stuck to the sheet and alternately arranged in the longitudinal direction; a separating line formed at at least a portion of the sheet which is located in a widthwise direction of the sheet between a center position of the second medium in the widthwise direction and a first end of the second medium in the widthwise direction, the line being formed at a portion of the sheet to which the second medium is stuck and which is located between a first end of the second medium in the longitudinal direction and a second end of the second medium in the longitudinal direction, the separating line comprising a portion formed through or cut in the sheet in a thickness direction of the sheet; and an image provided on the second medium extending in the longitudinal direction.

Still another aspect of the disclosure relates to a tape roll comprising: a spool; and a tape wound around the spool, the tape comprising: a sheet having a strip shape; a first medium and a second medium arranged adjacent to each other in a longitudinal direction of the sheet, the first medium and the second medium being spaced apart from each other in the longitudinal direction, the first medium and the second medium being peelably stuck to the sheet; a first separating line formed at a portion of the sheet which is located between the first medium and the second medium arranged in the longitudinal direction as a pair, the first separating line extending, in a widthwise direction orthogonal to the longitudinal direction, over at least a portion of a region extending in the widthwise direction from a first end of the sheet in the widthwise direction to a second end of the sheet in the widthwise direction, the first separating line comprising a portion formed through or cut in the sheet in a thickness direction of the sheet; and a second separating line formed at a portion of the sheet which is located in the widthwise direction between a center position of the second medium in the widthwise direction and a first end of the second medium which is nearer in the widthwise direction to the first end of the sheet in the widthwise direction than the center position of the second medium in the widthwise direction, the second separating line being formed at at least a portion of the sheet to which the second medium is stuck and which is located between a first end of the second medium in the longitudinal direction and a second end of the second medium in the longitudinal direction, the second separating line comprising a portion formed through or cut in the sheet in the thickness direction.

Still another aspect of the disclosure relates to a tape roll comprising: a spool; and a tape wound around the spool, the tape comprising: a sheet having a strip shape; a first medium and a second medium arranged adjacent to each other in a longitudinal direction of the sheet, the first medium and the second medium being spaced apart from each other in the longitudinal direction, the first medium and the second medium being peelably stuck to the sheet; a first separating line formed at a portion of the sheet which is located between the first medium and the second medium arranged in the longitudinal direction as a pair, the first separating line extending, in a widthwise direction orthogonal to the longitudinal direction, over at least a portion of a region extending in the widthwise direction from a first end of the sheet in the widthwise direction to a second end of the sheet in the widthwise direction, the first separating line comprising a portion formed through or cut in the sheet in a thickness direction of the sheet; and a second separating line formed at a portion of the sheet which is located in the widthwise direction between a center position of the second medium in the widthwise direction and a first end of the second medium which is nearer in the widthwise direction to the first end of the sheet in the widthwise direction than the center position of the second medium in the widthwise direction, the second separating line being formed at at least a portion of the sheet to which the second medium is stuck and which is located between a first end of the second medium in the longitudinal direction and a second end of the second medium in the longitudinal direction, the second separating line comprising a portion formed through or cut in the sheet in the thickness direction, wherein the second medium is located on one of opposite end portions of the tape roll, which one is farther from the spool than the other, in the pair of the first medium and the second medium.

Still another aspect of the disclosure relates to a tape cassette comprising: a tape roll comprising (a) a spool and (b) a tape wound around the spool, the tape comprising (i) a sheet having a strip shape, (ii) a first medium and a second medium arranged adjacent to each other in a longitudinal direction of the sheet, the first medium and the second medium being spaced apart from each other in the longitudinal direction, the first medium and the second medium being peelably stuck to the sheet, (iii) a first separating line formed at a portion of the sheet which is located between the first medium and the second medium arranged in the longitudinal direction as a pair, the first separating line extending, in a widthwise direction orthogonal to the longitudinal direction, over at least a portion of a region extending in the widthwise direction from a first end of the sheet in the widthwise direction to a second end of the sheet in the widthwise direction, the first separating line comprising a portion formed through or cut in the sheet in a thickness direction of the sheet, and (iv) a second separating line formed at a portion of the sheet which is located in the widthwise direction between a center position of the second medium in the widthwise direction and a first end of the second medium which is nearer in the widthwise direction to the first end of the sheet in the widthwise direction than the center position of the second medium in the widthwise direction, the second separating line being formed at at least a portion of the sheet to which the second medium is stuck and which is located between a first end of the second medium in the longitudinal direction and a second end of the second medium in the longitudinal direction, the second separating line comprising a portion formed through or cut in the sheet in the thickness direction, wherein the second medium is located on one of opposite end portions of the tape roll, which one is farther from the spool than the other, in the pair of the first medium and the second medium; a ribbon roll that is a roll of an ink ribbon to be used for printing on the tape roll; a housing that houses the tape roll and the ribbon roll; an opening that exposes the ink ribbon and the tape to an outside of the housing; and an output portion through which the tape exposed to the outside of the housing through the opening is to be passed, wherein the tape further comprises a plurality of pairs of first media and second media each as the pair of the first medium and the second medium, and wherein a length between the opening and the output portion is less than a distance between two pairs of the plurality of the pairs of the first media and the second media, which two pairs are adjacent to each other in the longitudinal direction.

Still another aspect of the disclosure relates to a tape cassette comprising: a tape roll that is a roll of a tape wound around a spool, the tape comprising (i) a sheet having a strip shape, (ii) a first medium and a second medium arranged adjacent to each other in a longitudinal direction of the sheet, the first medium and the second medium being spaced apart from each other in the longitudinal direction, the first medium and the second medium being peelably stuck to the sheet, (iii) a first separating line formed at a portion of the sheet which is located between the first medium and the second medium arranged in the longitudinal direction as a pair, the first separating line extending, in a widthwise direction orthogonal to the longitudinal direction, over at least a portion of a region extending in the widthwise direction from a first end of the sheet in the widthwise direction to a second end of the sheet in the widthwise direction, the first separating line comprising a portion formed through or cut in the sheet in a thickness direction of the sheet, (iv) a second separating line formed at a portion of the sheet which is located in the widthwise direction between a center position of the second medium in the widthwise direction and a first end of the second medium which is nearer in the widthwise direction to the first end of the sheet in the widthwise direction than the center position of the second medium in the widthwise direction, the second separating line being formed at at least a portion of the sheet to which the second medium is stuck and which is located between a first end of the second medium in the longitudinal direction and a second end of the second medium in the longitudinal direction, the second separating line comprising a portion formed through or cut in the sheet in the thickness direction, the second medium comprising an image extending in the longitudinal direction and at least formed in a first color different from a ground color of the second medium; a ribbon roll that is a roll of an ink ribbon to be used for printing on the tape roll; and a housing that houses the tape roll and the ribbon roll, wherein the ink ribbon comprises ink of a second color different from the first color.

BRIEF DESCRIPTION OF THE DRAWINGS

The objects, features, advantages, and technical and industrial significance of the present disclosure will be better understood by reading the following detailed description of the embodiment, when considered in connection with the accompanying drawings, in which:

FIG. 5A is a view of a tape, the longitudinal direction of which coincides with the right and left direction in FIG. 5A;

FIG. 5B is a view of a sheet, illustrating its portion to which a first medium had been stuck and its portion to which a second medium had been stuck, in the case where the first medium and the second medium are peeled off;

FIG. 5C is a view of the tape with images printed on the first medium and the second medium;

FIG. 7A is a view of a tape in a modification;

FIG. 7B is a view of a tape in another modification;

FIG. 7C is a view of a tape in still another modification;

FIG. 7D is a view of a tape in still another modification; and

DETAILED DESCRIPTION OF THE EMBODIMENT

Figure 1:
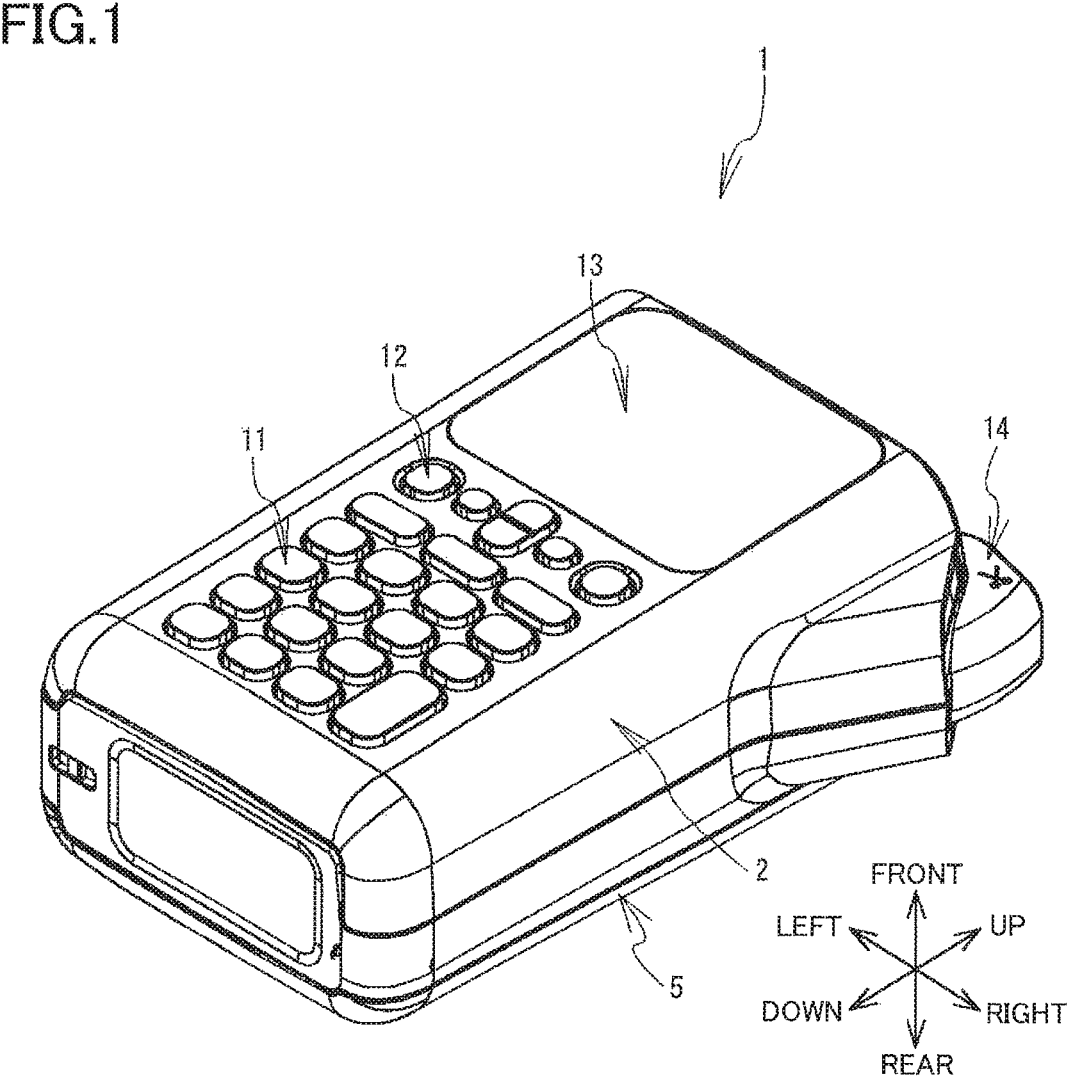
FIG. 1 is a perspective view of a printing apparatus.

Hereinafter, there will be described one embodiment by reference to the drawings. The drawings are for explanation of technical features employable in the present disclosure. It is to be understood that the configuration illustrated in the drawings does not limit the present disclosure and is only one example.

Overall Configuration of Printing Apparatus

There will be described overall configurations of a printing apparatus 1 and a tape cassette 6 according to the present embodiment with reference to FIGS. 1-4. The upper side, the lower side, the lower right side, the upper left side, the upper right side, and the lower left side in FIG. 1 are defined as a front side, a rear side, a right side, a left side, an upper side, and a lower side of the printing apparatus 1, respectively. The lower side, the upper side, the right side, and the left side in FIG. 4, and the front side and the back side of FIG. 4 are defined as a front side, a rear side, a right side, a left side, an upper side, and a lower side of the tape cassette 6, respectively.

As illustrated in FIG. 1, the printing apparatus 1 has a substantially rectangular parallelepiped shape. The printing apparatus 1 includes a housing 2, a cover 5, a keyboard 11, a function key group 12, a liquid crystal display 13, and a cutting knob 14. The housing 2 and the cover 5 are formed of resin. The housing 2 is shaped like a box having an opening at its rear end portion and having a rectangular shape when viewed from a front side of the housing 2. The cover 5 is openably attached to a rear portion of the housing 2. FIG. 1 illustrates a state in which the cover 5 is closed, and the cover 5 covers an opening formed in the housing 2. The keyboard 11 is provided on a lower side of the center of a front surface of the housing 2. The keyboard 11 is used for input of characters, for example. The function key group 12 is provided on an upper side of the keyboard 11. The function key group 12 is for turning a power source on and off and controlling the printing apparatus 1, for example. The liquid crystal display 13 is provided on an upper side of the function key group 12. The liquid crystal display 13 is configured to display characters and symbols input by a user, for example. The cutting knob 14 is provided at an upper right portion of the housing 2 so as to be movable in a lower left direction. The cutting knob 14 protrudes from the housing 2 toward an upper right side thereof.

Figure 2:
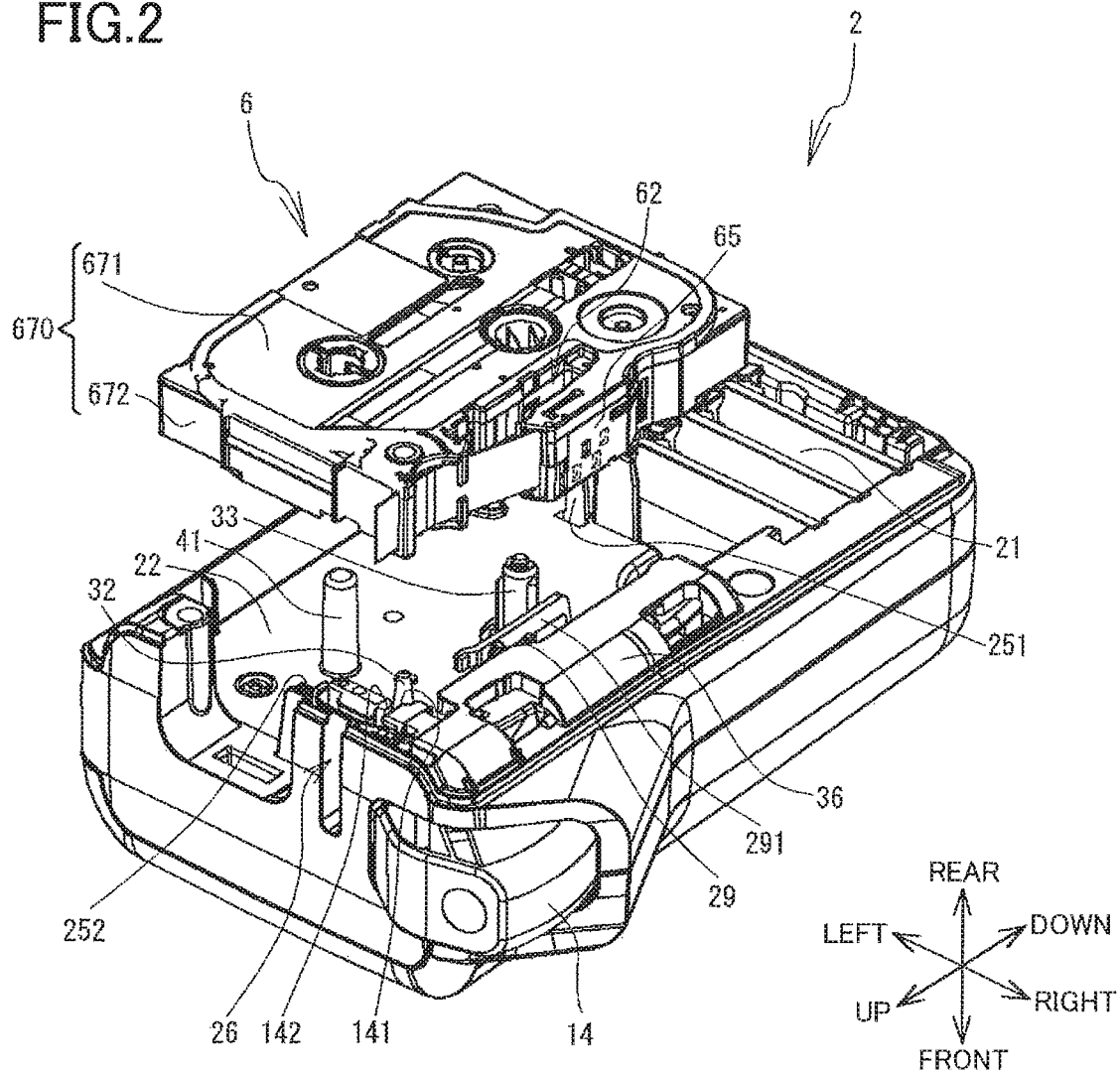
FIG. 2 is a perspective view of the printing apparatus, with a cover opened.
Figure 3:
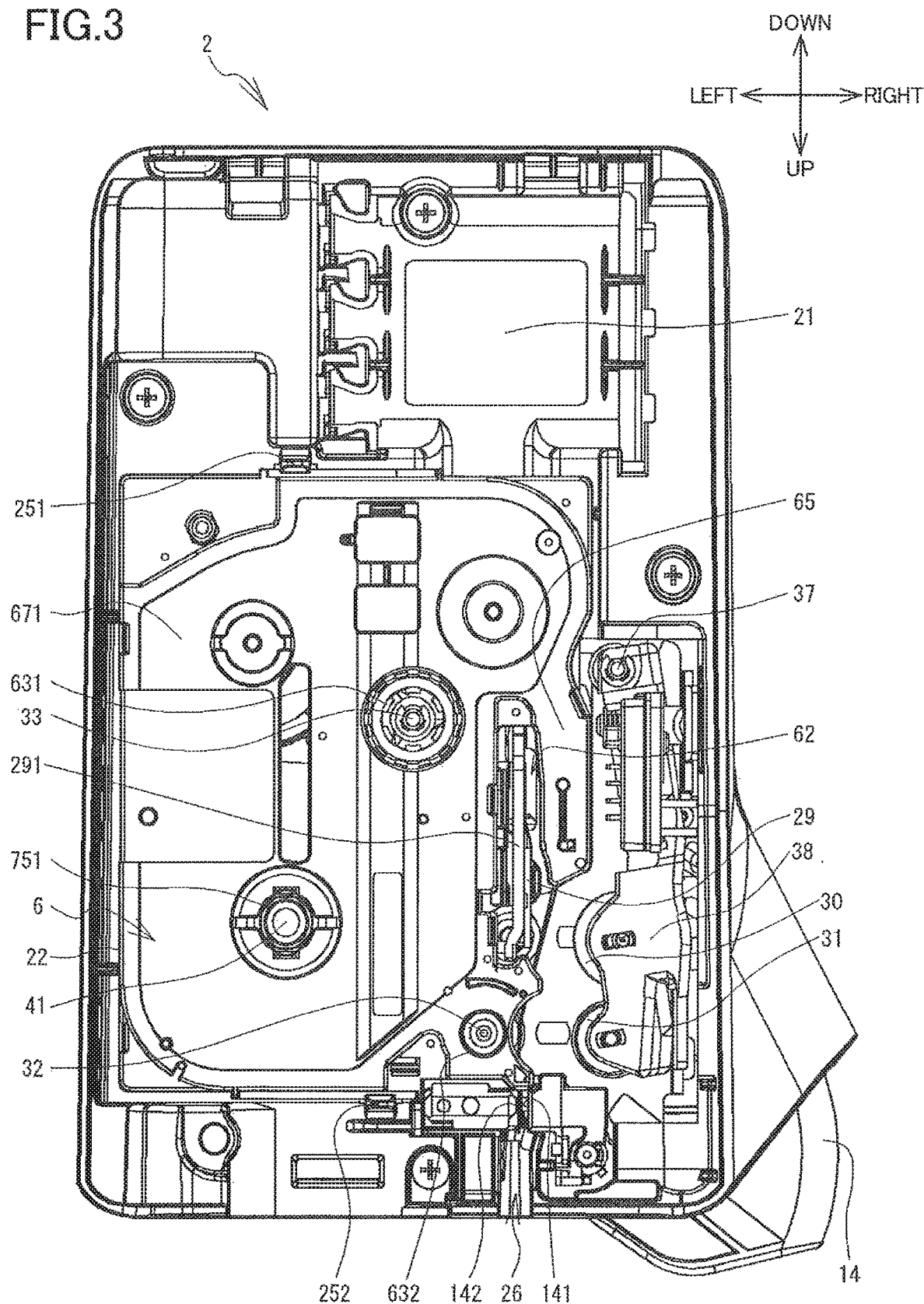
FIG. 3 is a plan view of the printing apparatus, with the cover opened and a protector removed.
Figure 4:
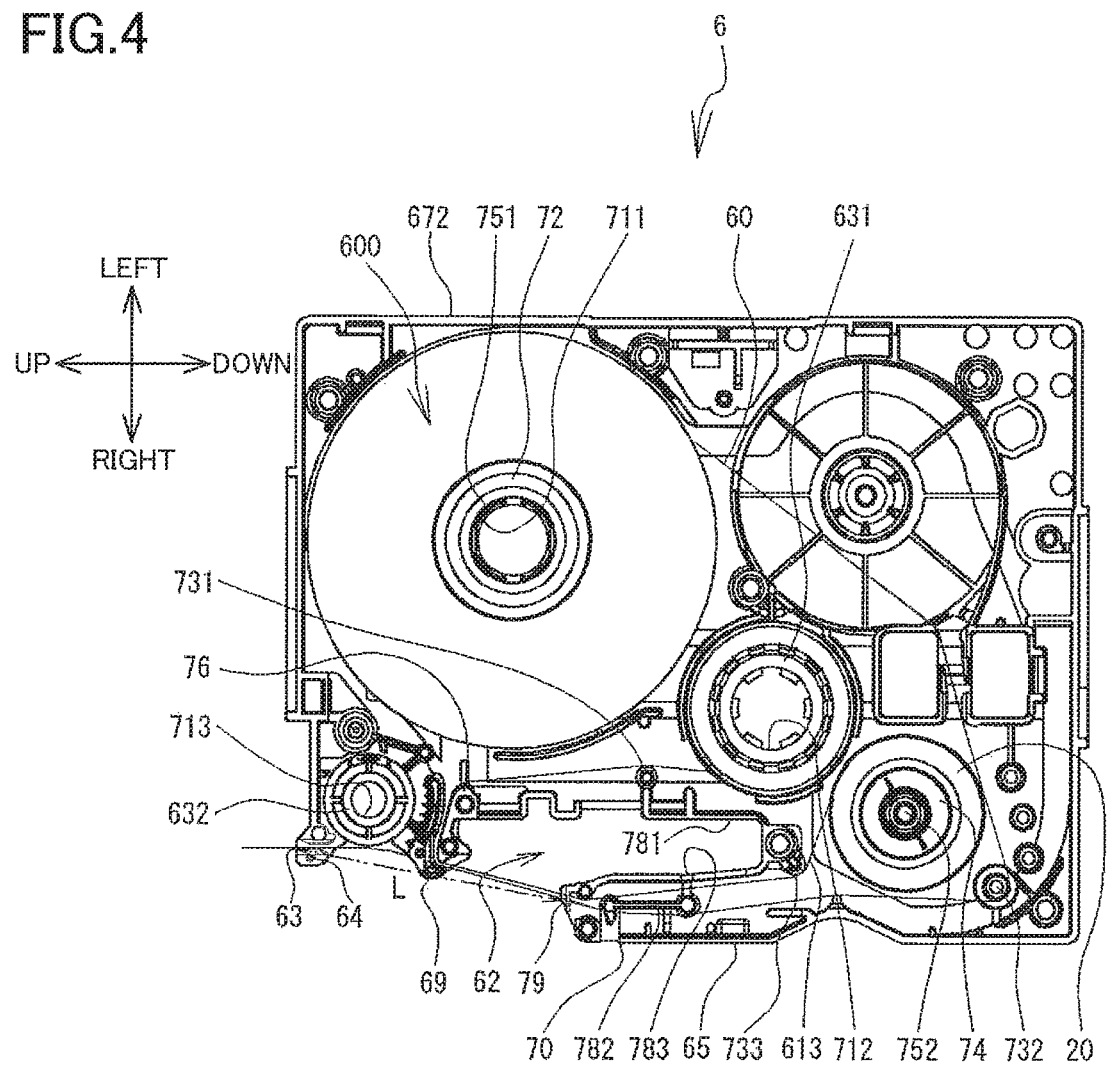
FIG. 4 is a plan view of a tape cassette, with a first casing removed.

As illustrated in FIGS. 2 and 3, the printing apparatus 1 includes a battery holder 21, a cassette holder 22, a platen holder 38, a platen roller 30, a tape sub-roller 31, a protector 36, an output opening 26, a movable blade 141, and a fixed blade 142, which are provided in the housing 2. The battery holder 21 is a recess provided at a portion of the housing 2 which is located on a lower right side of the center of the housing 2. Six batteries are installable in and removable from the battery holder 21.

The cassette holder 22 is a recess located on an upper side of the battery holder 21 and contiguous thereto. The tape cassette 6 is installable in the cassette holder 22 from a rear side thereof. As illustrated in FIG. 3, the cassette holder 22 is provided with a head holder 291, a thermal head 29, a tape-driving-roller shaft 32, a ribbon take-up shaft 33, a positioning boss 41, and hooks 251, 252, for example. The head holder 291 is shaped like a plate extending in the up and down direction and located on a right side of the center of the cassette holder 22 in the right and left direction. The thermal head 29 is provided on a right surface of the head holder 291. The tape-driving-roller shaft 32 is provided on an upper side of the head holder 291 so as to extend in the front and rear direction. The ribbon take-up shaft 33 is provided at substantially the center of the cassette holder 22 so as to extend in the front and rear direction. The ribbon take-up shaft 33 is rotatably fitted in a ribbon take-up spool 631 provided on the tape cassette 6. The ribbon take-up shaft 33 and the tape-driving-roller shaft 32 are rotated such that a tape 60 and an ink ribbon 613 (see FIG. 4) are conveyed at the same speed. The positioning boss 41 is shaped like a circular cylinder provided at an upper left portion of the head holder 291 so as to extend in the front and rear direction. The hook 251 protrudes rearward from a lower end portion of the cassette holder 22. The hook 252 protrudes rearward from an upper end portion of the cassette holder 22. The hooks 251, 252 are engageable with the tape cassette 6 installed on the cassette holder 22.

The platen holder 38 is located to the right of the cassette holder 22 so as to extend in the up and down direction. The platen holder 38 is supported at its lower end portion so as to be pivotable about a pivot shaft 37 extending in the front and rear direction. The platen roller 30 and the tape sub-roller 31 are supported by the platen holder 38 so as to be rotatable in the counterclockwise direction when viewed from a rear side of the platen roller 30 and the tape sub-roller 31. The platen roller 30 is provided to the right of the thermal head 29. The tape sub-roller 31 is provided to the right of the tape-driving-roller shaft 32 and near an upper portion of the platen roller 30. A spring, not illustrated, urges the platen holder 38 such that the platen holder 38 pivots rightward about the pivot shaft 37. As illustrated in FIG. 2, the protector 36 is provided at a rear of the platen holder 38 so as to extend in the up and down direction.

The output opening 26 extends in the down direction from an upper end of the housing 2. The movable blade 141 and the fixed blade 142 are provided on a lower side of the output opening 26 and respectively on opposite sides of a tape conveyance path in the right and left direction. The tape conveyance path is a path through which the tape 60 contained in the tape cassette 6 is conveyed. Cutting edges of the movable blade 141 and the fixed blade 142 face the tape conveyance path. A right portion of the movable blade 141 is in contact with the cutting knob 14. When the cutting knob 14 is pushed toward a lower left side thereof, the movable blade 141 is pushed by the cutting knob 14 and moved toward the fixed blade 142. This operation causes the movable blade 141 to cut the tape 60 located between the movable blade 141 and the fixed blade 142. The printed tape 60 cut by the fixed blade 142 and the movable blade 141 is discharged to the outside of the housing 2 through the output opening 26.

Overall Configuration of Tape Cassette 6

As illustrated in FIG. 2, the tape cassette 6 has a rectangular parallelepiped shape. The shape of the tape cassette 6 is substantially rectangular in plan view. As illustrated in FIG. 4, the tape cassette 6 includes a housing 670, a pair of guides 69, a ribbon separator 76, and an arm 65. The housing 670 contains a tape roll 600 and a ribbon roll 20. The housing 670 includes a first casing 671 and a second casing 672. The second casing 672 is shaped like a box having an opening at its rear end. The first casing 671 is shaped like a plate that closes the opening of the second casing 672.

As illustrated in FIG. 4, the tape cassette 6 includes support holes 711, 712, 713, the tape roll 600, a cassette boss 751, a reel boss 752, the ribbon roll 20, a tape conveying roller 632, guide pins 731, 732, 733, and an output portion 64, which are provided in the second casing 672. The support hole 711 supports a spool 72 for the tape roll 600 such that the spool 72 is rotatable. The tape roll 600 is a roll of the tape 60 wound around the spool 72. The support hole 712 supports the ribbon take-up spool 631. The ribbon take-up spool 631 takes up the ink ribbon 613 from the ribbon roll 20 wound around a spool 74. The cassette boss 751 and the reel boss 752 are provided upright on a lower surface of the second casing 672. The cassette boss 751 supports the spool 72 such that the spool 72 is rotatable. The reel boss 752 supports the spool 74 for the ribbon roll 20 such that the spool 74 is rotatable. The ribbon roll 20 is a roll of the ink ribbon 613 to be used for printing on the tape roll 600. The ink ribbon 613 is wound around the spool 74. The support hole 713 supports the tape conveying roller 632 such that the tape conveying roller 632 is rotatable. The tape conveying roller 632 is rotated with the tape sub-roller 31 (see FIG. 3) to draw the tape 60 from the tape roll 600. The pair of upper and lower guides 69 are provided near a lower right portion of the tape conveying roller 632. The ribbon separator 76 is provided near left portions of the guides 69. The guide pin 731 is provided on an upper right side of the support hole 712 so as to extend in the front and rear direction. The guide pin 731 guides movement of the ink ribbon 613 that had been used for printing. The guide pin 732 is provided on a lower right side of the reel boss 752 so as to extend in the front and rear direction. The guide pin 732 guides movement of the unprinted tape 60. The guide pin 733 is provided on an upper right side of the reel boss 752 so as to extend in the front and rear direction. The guide pin 733 guides movement of the ink ribbon 613 that has not been used for printing. The output portion 64 is provided on an upper right side of the support hole 713 so as to protrude toward an upper right side of the output portion 64. The output portion 64 has an output opening 63. The output opening 63 extends through the output portion 64 in the up and down direction. The width of the output opening 63 in the front and rear direction is greater than or equal to that of the tape 60 in the front and rear direction. The tape 60 exposed to the outside of the housing 670 through an opening 79 which will be described below passes through the output opening 63.

The arm 65 is provided to the right of the guide pin 733 so as to extend upward. The arm 65 has walls 70, 783, 782 and the opening 79. The wall 70 serves as a right surface of the arm 65. The wall 783 is disposed to the left of the wall 70 so as to be substantially parallel with the wall 70. The wall 783 serves as a left surface of the arm 65. The wall 782 is shaped like a thin plate extending in the up and down direction and disposed at a central position between the wall 783 and the wall 70 of the arm 65. The ink ribbon 613 drawn from the ribbon roll 20 and the tape 60 drawn from the tape roll 600 are exposed to the outside of the housing 670 through the opening 79. The ink ribbon 613 and the tape 60 are held between the opening 79 and the guides 69 so as to be exposed to the outside of the tape cassette 6. The opening 79 is formed in an upper end portion of the arm 65 at a position located near an upper portion of the wall 782. A head inserted portion 62 is a recess defined by the wall 783 of the arm 65 and a side wall 781 opposed to the arm 65. The head inserted portion 62 has a U-shape opening at an upper right portion of the head inserted portion 62. In the case where the tape cassette 6 is installed on the cassette holder 22 of the printing apparatus 1, the head holder 291 (see FIG. 3) is inserted into the head inserted portion 62.

Print Procedure

As illustrated in FIGS. 2-4, in the case where the tape cassette 6 is installed on the cassette holder 22 of the printing apparatus 1, the ribbon take-up shaft 33 and the tape-driving-roller shaft 32 are respectively fitted in the ribbon take-up spool 631 and the tape conveying roller 632 provided on the tape cassette 6, and the head holder 291 is inserted in the head inserted portion 62. The positioning boss 41 is fitted in the cassette boss 751. As a result, the tape cassette 6 is pressed into the cassette holder 22 in a state in which the tape cassette 6 is positioned, whereby the tape cassette 6 is installed on the cassette holder 22. After the tape cassette 6 is installed on the cassette holder 22, the cover 5 is closed. In the case where the cover 5 is closed, a roller-holder cam, not illustrated, provided on the cover 5 presses the platen holder 38 leftward. The platen holder 38 pivots leftward against an urging force of the spring, not illustrated.

In the case where the printing apparatus 1 executes a print processing, the tape 60 is conveyed from the spool 72 via the guide pin 732 through an area between the wall 782 and the wall 70 of the arm 65. The ink ribbon 613 is conveyed from the spool 74 via the guide pin 733 through an area between the wall 782 and the wall 783 of the arm 65. The ink ribbon 613 is located to the left of the tape 60 in the arm 65 and between the opening 79 and the output portion 64. The ink ribbon 613 and the tape 60 are arranged one on another in the right and left direction and conveyed from the opening 79 to the head inserted portion 62. The tape 60 and the ink ribbon 613 are then pressed onto the thermal head 29 by the platen roller 30. Heat generated by the thermal head 29 heats the ink ribbon 613 from a left side thereof. As a result, ink is transferred to the tape 60 by heat, so that an image such as characters is printed on the tape 60.

The ink ribbon 613 is separated from the tape 60 by the ribbon separator 76. The separated ink ribbon 613 is conveyed through the guide pin 731 and taken up by the ribbon take-up spool 631. The printed tape 60 from which the ink ribbon 613 is separated by the ribbon separator 76 is conveyed to the tape conveying roller 632 in a state in which upward and downward movement of the printed tape 60 is restricted by the guides 69. The printed tape 60 is then pressed by the tape sub-roller 31 onto the tape conveying roller 632 that is rotated by the tape-driving-roller shaft 32. The printed tape 60 is discharged from the label output opening 26 by rotation of the tape conveying roller 632.

Tape 60

As illustrated in FIG. 5A, the tape 60 includes a strip-shaped sheet 7, a plurality of pairs of first media 8 and second media 9 each as a label, first separating lines 44, and a second separating line 43. The first media 8 and the second media 9 are removably stuck to the sheet 7. In the present example, the sheet 7 is release paper (such as glassine, high-quality paper, or kraft paper) covered with a release agent formed of a silicon-based material, for example. The sheet 7 may be formed of a material other than the release paper. For example, the sheet 7 may be a release film formed of a resin film.

The first medium 8 and the second medium 9 of each pair are arranged adjacent to each other in a longitudinal direction 16 of the sheet 7. The first medium 8 and the second medium 9 are spaced apart from each other in the longitudinal direction 16 and stuck to the sheet 7 such that the first medium 8 and the second medium 9 can be peeled off from the sheet 7. In the present example, the first medium 8 and the second medium 9 have the same length in the longitudinal direction 16 of the sheet 7 and the same length in a widthwise direction 17 of the sheet 7. Also, the first medium 8 and the second medium 9 have the same shape and the same size. It is noted that the shapes of the first medium 8 and the second medium 9 need not be completely the same as each other and may be substantially the same as each other. This applies to the size of the first medium 8 and the second medium 9. Ground colors of the first medium 8 and the second medium 9 are the same as each other and are white, for example. The ground colors of the first medium 8 and the second medium 9 may be colors other than white (e.g., yellow or black) and may be different from each other. The ground color of each of the first medium 8 and the second medium 9 is not limited to a single color and may include a plurality of colors. A particular pattern may be formed on the first medium 8 and the second medium 9. Each of the first medium 8 and the second medium 9 is a film formed of resin such as PET, PVC, PP, PE, PS, and ABS, for example. Each of the first medium 8 and the second medium 9 has a surface opposed to the sheet 7, and an adhesive layer is provided on this surface. The adhesive layer includes an adhesive formed of an acrylic-based material, for example. The first medium 8 and the second medium 9 are stuck to the sheet 7 by their respective adhesive layers. The second medium 9 is located on one of opposite end portions (a right end portion in FIG. 5A) of the tape roll 600, which one is farther from the spool 72 than the other. In each pair of the first medium 8 and the second medium 9, the second medium 9 is farther from the spool 72 provided for the tape roll 600 than the first medium 8, that is, the second medium 9 is located to the right of the first medium 8 in FIG. 5A. That is, in each pair of the first medium 8 and the second medium 9, the first medium 8 is nearer to the spool 72 than the second medium 9. In the present example, the first medium 8 and the second medium 9 of each pair are respectively located on opposite sides of a corresponding one of the first separating line 44 in the longitudinal direction 16.

The second medium 9 has an image 42 extending in the longitudinal direction 16. The second medium 9 has one end 93 and the other end 94 in the widthwise direction 17. The image 42 is disposed between the center M2 of the second medium 9 in the widthwise direction 17 and the other end 94 of the second medium 9 in the widthwise direction 17. In the present example, the color of the image 42 is different from the ground color of the second medium 9. For example, in the case where the ground color of the second medium 9 is white, the color of the image 42 is yellow, red, orange, or blue, for example. The image 42 need not be formed in a single color and may include a plurality of colors and/or a pattern, for example. The ink ribbon 613 has ink of a color different from that of the image 42, for example, the ink ribbon 613 has black ink. Specifically, the ink ribbon 613 has a strip shape and includes an ink layer and a substrate. The substrate is formed of polyethylene terephthalate (PET), for example. The ink layer contains a color component and a binder component such as wax and/or resin. In the case where the ink ribbon 613 has black ink, the color component contained in the ink layer is carbon, for example. In the present example, a plurality of pairs 10 of the first media 8 and the second media 9, each as the pair of the first medium 8 and the second medium 9 adjacent to each other in the longitudinal direction 16, are arranged in the longitudinal direction. One of the pairs 10 and another of the pairs 10 which is located next to the one pair 10 are spaced apart from each other in the longitudinal direction 16. In the present example, a portion of the sheet 7 which is located between the one pair 10 and said another pair 10 in the longitudinal direction 16 does not have any through portion (e.g., a through hole or a through opening) or any cut portion formed through or cut in the sheet 7 in its thickness direction. The portion of the sheet 7 which is located between the one pair 10 and said another pair 10 in the longitudinal direction 16 may have such through portion and/or cut portion formed through or cut in the sheet 7 in its thickness direction. The length L between the opening 79 and the output portion 64 illustrated in FIG. 4 is less than the distance D1 between two of the plurality of pairs of the first media 8 and the second media 9 illustrated in FIG. 5A, which two are adjacent to each other in the longitudinal direction 16 of the sheet 7. The length of each of the first medium 8 and the second medium 9 in the widthwise direction 17 is less than that of the sheet 7 in the widthwise direction 17 in the present example. The sheet 7 has portions exposed to the outside without the first medium 8 or the second medium 9 being stuck to the portions as indicated by the white portions of the sheet 7 in FIG. 5B.

For each pair of the first medium 8 and the second medium 9, the first separating line 44 is located on the sheet 7 between the first medium 8 and the second medium 9 in the longitudinal direction 16 so as to extend between one end 71 and the other end 73 of the sheet 7 in the widthwise direction 17 orthogonal to the longitudinal direction 16. The first separating line 44 includes a portion of the sheet 7 which is cut in the thickness direction or through which holes or the like is formed in the thickness direction. In the present example, the first separating line 44 extends in the widthwise direction 17 from the second separating line 43 to the other end 73 of the sheet 7 in the widthwise direction 17 but does not extend between the second separating line 43 and the one end 71 of the sheet 7 in the widthwise direction 17. The first separating line 44 and the second separating line 43 intersect each other at an intersection point Q. The intersection point Q is located at one end of the first separating line 44 in the widthwise direction 17. In the present example, the first separating line 44 is perforation formed through the sheet 7 in the thickness direction. That is, the first separating line 44 includes holes formed through the sheet 7 in the thickness direction and spaced uniformly.

The second separating line 43 includes a portion of the sheet 7 which is cut in the thickness direction or through which holes or the like is formed in the thickness direction. As illustrated in FIG. 5B, the second separating line 43 is located between (i) the center M2 of the second medium 9 in the widthwise direction 17 and (ii) the one end 93 of the second medium 9 in the widthwise direction 17. The one end 93 of the second medium 9 in the widthwise direction 17 is nearer to the one end 71 of the sheet 7 in the widthwise direction 17 than the center M2 of the second medium 9 in the widthwise direction 17. The second separating line 43 is provided at a portion 95 of the sheet 7 to which the second medium 9 is stuck. The portion 95 extends in the longitudinal direction 16 from one end 91 to the other end 92 of the second medium 9 in the longitudinal direction 16. In the present example, like the first separating line 44, the second separating line 43 is perforation formed through the sheet 7 in the thickness direction. The first separating line 44 and the second separating line 43 may be in different forms as long as each of the first separating line 44 and the second separating line 43 includes a portion of the sheet 7 which is cut in the thickness direction or through which holes or the like is formed in the thickness direction. In the present example, the second separating line 43 continuously extends from the one end to the other end of the sheet 7 in the longitudinal direction 16. That is, the second separating line 43 extends, from one end 81 of the first medium 8 in the longitudinal direction 16, to the other end 92 of the second medium 9 in the longitudinal direction 16, through the portion 95 of the sheet 7 to which the second medium 9 is stuck and through a portion 85 of the sheet 7 to which the first medium 8 is stuck. The one end 81 of the first medium 8 in the longitudinal direction 16 is nearer to one end of the sheet 7 than the center M3 of the first medium 8 in the longitudinal direction 16. That is, the one end 81 of the first medium 8 in the longitudinal direction 16 is located to the left of the center M3 of the first medium 8 in the longitudinal direction 16 in FIGS. 5A-5D. The other end 92 of the second medium 9 in the longitudinal direction 16 is nearer to the other end of the sheet 7 than the center M4 of the second medium 9 in the longitudinal direction 16. That is, the other end 92 of the second medium 9 in the longitudinal direction 16 is located to the right of the center M4 of the second medium 9 in the longitudinal direction 16. In the present example, the second separating line 43 formed not only through the portion 95 of the sheet 7 to which the second medium 9 is stuck but also through the portion 85 of the sheet 7 to which the first medium 8 is stuck and through an area located between the portions 85, 95 on the sheet 7. The second separating line 43 is disposed at a distance of greater than or equal to 3 mm in the widthwise direction 17 from the one end 71 of the sheet 7 in the widthwise direction 17. That is, the distance D2 from the one end 71 of the sheet 7 in the widthwise direction 17 to the second separating line 43 and the intersection point Q in the widthwise direction 17 is greater than or equal to 3 mm.

Method of Manufacturing Tape 60

A strip-shaped medium is stuck to a surface of the sheet 7. The medium stuck to the sheet 7 is cut into shapes of the first media 8 and the second media 9 of the plurality of pairs. In this cutting, the sheet 7 is not cut, that is, half cut (kiss cut) is not performed. A portion of the medium which is different from the first media 8 and the second media 9 is peeled off and removed from the sheet 7. The first separating line 44 and the second separating line 43 are formed on the sheet 7. In this operation, the first medium 8 and the second medium 9 are not processed. The image 42 is then formed on the second medium 9. The order of these operations may be changed as needed.

The first media 8 and the second media 9 are incorporated in the tape cassette 6 installed on the printing apparatus 1. As illustrated in FIG. 5C, for example, an image 86 is printed on each of the first media 8, and an image 96 is printed on the second medium 9. The images 86, 96 are formed by dividing an original image having a length greater than that of the first medium 8 and the second medium 9 in the widthwise direction 17. Each of the images 86, 96 is less than or equal to a corresponding one of the media 8, 9 in length in the widthwise direction 17. One example of the original image is a warning image used in a factory. Data for printing of the images 86, 96 is created by the printing apparatus 1 in a well-known manner.

Method of Sticking First Medium 8 and Second Medium 9

There will be next explained a procedure of sticking the image-printed first medium 8 and second medium 9 to each other in the widthwise direction 17, with reference to FIGS. 5A-6B. FIG. 5C illustrates one example in which the image 86 and the image 96 are printed on the first medium 8 and the second medium 9 by the printing apparatus 1, respectively, and the tape 60 is cut at a position between the printed first medium 8 and the second medium 9 of the next pair based on an operation of the cutting knob 14. The image 86 and the image 96 are oriented in opposite directions, respectively. In the present example, since the second medium 9 is farther from the spool 72 provided for the tape roll 600 than the first medium 8 in each pair of the first medium 8 and the second medium 9, printing on the second medium 9 is performed before printing on the first medium 8. When the second medium 9 is discharged from the output opening 63 after the printing on the second medium 9, the user can start a separating operation before completion of printing on the first medium 8. In the separating operation, the user separates the sheet 7 along the first separating line 44 and then separates the sheet 7 along the second separating line 43 located in the portion 95 and intersecting with the first separating line 44 at the intersection point Q. The separating operation may be performed after printing on the first medium 8. After printing on the first medium 8, the user operates the cutting knob 14 to cut the sheet 7 at a position located between the printed first medium 8 and the second medium 9 of the next pair in the longitudinal direction 16.

Figure 6A:
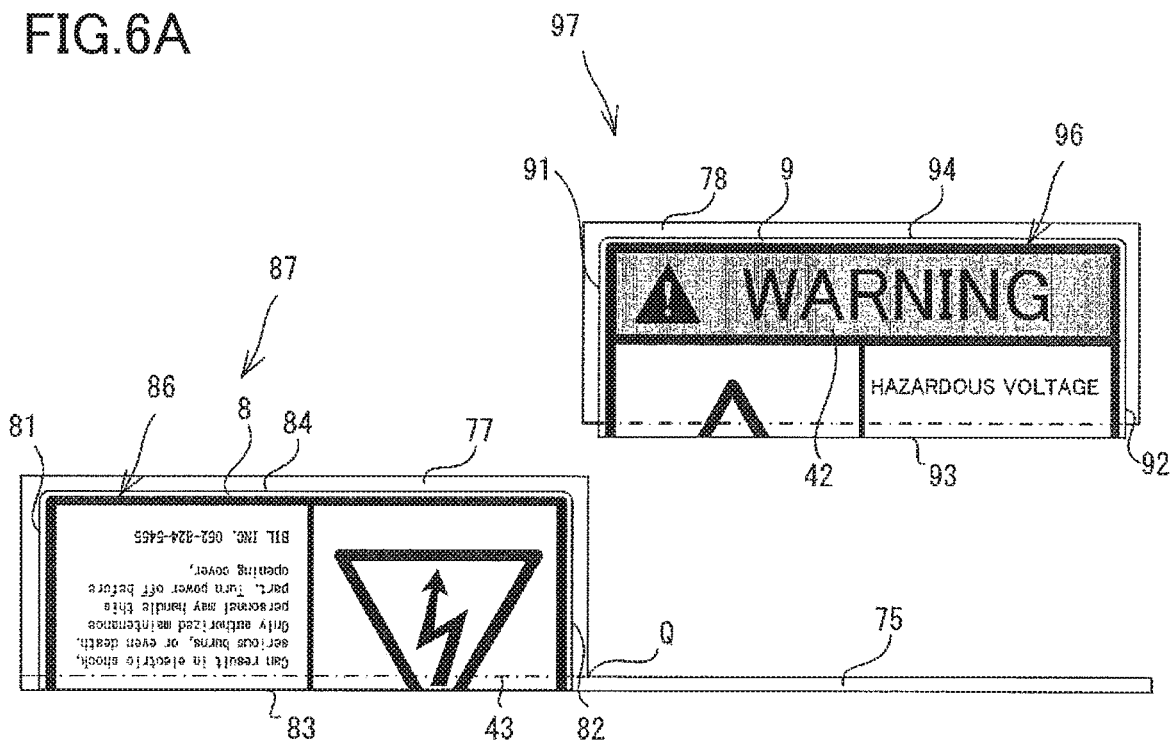
FIG. 6A is a view of a tape including the printed first medium and the printed second medium and separated into two tapes along a first separating line and a second separating line.
Figure 6B:
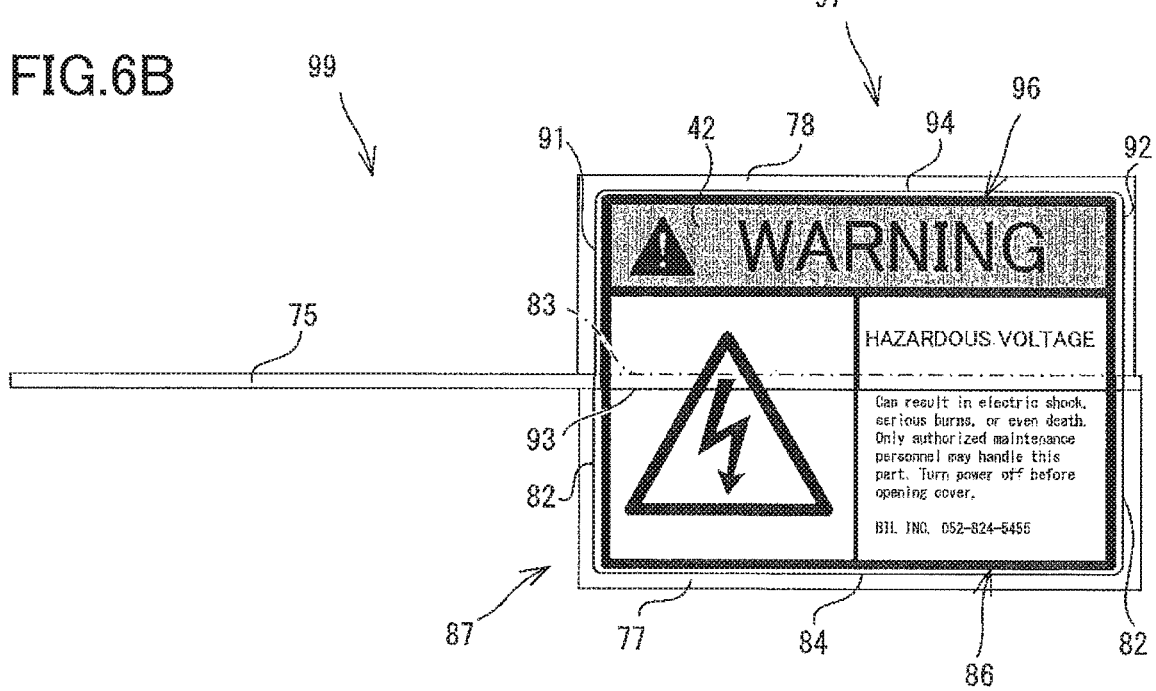
FIG. 6B is a view of a state in which the second medium is stuck to the first medium after the tape is separated into the two tapes.

These operations, as illustrated in FIG. 6A, separate the tape 60 into a tape 87 including the printed first medium 8 and a tape 97 including the printed second medium 9. The tape 87 includes partial sheets 77, 75 and the first medium 8, specifically. The partial sheet 77 is a rectangular portion of the sheet 7 which includes the portion 85. The partial sheet 75 extends in the longitudinal direction 16 from the intersection point Q on the partial sheet 77 toward an opposite side of the first separating line 44 from the first medium 8. The partial sheets 77, 75 are continuous to each other. The tape 97 includes a partial sheet 78 and the second medium 9. Since the partial sheet 75 is separated in the longitudinal direction 16 from a portion of the second medium 9 near the one end 93 in the widthwise direction 17, the adhesive layer provided on the portion of the second medium 9 near the one end 93 is exposed to the outside. The user rotates the tape 87 180 degrees and places the one end 93 of the second medium 9 in the widthwise direction 17, at a predetermined position, on a portion of the first medium 8 near its one end 83 in the widthwise direction 17. Specifically, as illustrated in FIG. 6B, the user sticks the adhesive layer provided on the portion of the second medium 9 near the one end 93 and exposed to the outside, to the portion of the first medium 8 near its one end 83 in the widthwise direction 17, at a position at which the one end 81 of the first medium 8 in the longitudinal direction 16 is aligned to the other end 92 of the second medium 9 in the longitudinal direction 16, and the other end 82 of the first medium 8 in the longitudinal direction 16 is aligned to the one end 91 of the second medium 9 in the longitudinal direction 16. These operations enable the user to handle the first medium 8 and the second medium 9 as a one-piece medium 99. In the case where the user sticks the medium 99 to an object such as a wall, the user peels off the partial sheets 77, 78 from the medium 99 and sticks the medium 99 to a desired position.

In the above-described embodiment, the tape 60, the spool 72, the tape roll 600, the ink ribbon 613, the ribbon roll 20, the tape cassette 6, the housing 670, the opening 79, and the output portion 64 are respectively examples of a tape, a spool, a tape roll, a ribbon roll, a tape cassette, a housing, an opening, and an output portion. The sheet 7, the first medium 8, the second medium 9, the first separating line 44, and the second separating line 43 are respectively examples of a sheet, a first medium, a second medium, a first separating line, and a second separating line. The one end 71 and the other end 73 of the sheet 7 in the widthwise direction 16 are respectively examples of a first end and a second end of the sheet in the widthwise direction. The one end 81 and the other end 82 of the first medium 8 in the longitudinal direction 16 and the one end 83 and the other end 84 of the first medium 8 in the widthwise direction 17 are respectively examples of a first end and a second end of the first medium in the longitudinal direction and a first end and a second end of the first medium in the widthwise direction. The one end 91 and the other end 92 of the second medium 9 in the longitudinal direction 16 and the one end 93 and the other end 94 of the second medium 9 in the widthwise direction 17 are respectively examples of a first end and a second end of the second medium in the longitudinal direction and a first end and a second end of the second medium in the widthwise direction.

The tape cassette 6 according to the above-described embodiment includes the tape roll 600. In the tape 60 of the tape roll 600, the second separating line 43 enables the user to peel off only a portion of the sheet 7 between the opposite ends 93, 94 of the second medium 9 in the widthwise direction 17. As illustrated in FIGS. 6A and 6B, the user sticks the second medium 9 to the first medium 8 in the state in which the portion of the sheet 7 is peeled off. Thus, the user sticks the second medium 9 to the first medium 8 without the entire sheet-side-surface of the second medium 9 being exposed. In the tape 60, the first medium 8 and the second medium 9 are spaced apart from each other in the longitudinal direction 16 of the sheet 7, enabling the user to easily separate the sheet 7 along the first separating line 44.

In each pair of the first medium 8 and the second medium 9, the first medium 8 is nearer to the one end of the sheet 7 than the second medium 9 in the longitudinal direction 16. The second separating line 43 extends between the one end 81 of the first medium 8 in the longitudinal direction 16 and the other end 92 of the second medium 9 in the longitudinal direction 16, with respect to the center of the first medium 8 in the longitudinal direction 16, over the portion of the sheet 7 to which the second medium 9 is stuck and the portion of the sheet 7 to which the first medium 8 is stuck. This configuration enables the user to easily peel off a portion of the sheet 7 from a sticking portion of the second medium 9 (which is to be stuck to the first medium 8) along the second separating line 43 to expose the adhesive layer of the second medium 9 at the sticking portion. In this tape 60, the user can determine whether the sticking portion is to be provided on the first medium 8 or the second medium 9, based on a result of printing.

The first separating line 44 extends in the widthwise direction 17 from the second separating line 43 to the other end 73 of the sheet 7 in the widthwise direction 17 and does not extend between the second separating line 43 and the one end 71 of the sheet 7 in the widthwise direction 17. In the tape 60, as illustrated in FIG. 6A, when the sheet 7 is peeled off from the sticking portion of the second medium 9, a portion of the sheet 7 which is nearer to the one end 71 than the second separating line 43 is easily kept continuous to a portion of the sheet 7 to which the first medium 8 is stuck. This configuration can create the two partial sheets when the first medium 8 and the second medium 9 are stuck to each other.

The second separating line 43 is located at a distance of greater than or equal to 3 mm in the widthwise direction 17 from the one end 71 of the sheet 7 in the widthwise direction 17. This configuration makes it easier for the user to peel off the sheet 7 from the sticking portion at which the first medium 8 and the second medium 9 are to be stuck to each other when compared with a case where the second separating line 43 is located at a distance of less than 3 mm from the one end 71 of the sheet 7. In the configuration in which the distance from the one end 71 of the sheet 7 to the second separating line 43 is greater than or equal to 3 mm, the width of the partial sheet 75 is enough for the user to peel off the sheet 7 even in the case where the sheet 7 is a paper sheet. Thus, when the user peels off the sheet 7 along the second separating line 43 near the one end 71 of the sheet 7, it is difficult for the partial sheet 75 to be torn off.

The second medium 9 includes the image 42 extending in the longitudinal direction 16. In the case where the user sticks the first medium 8 and the second medium 9 to each other, there is a high possibility that the second medium 9 with the image 42 is stuck to an upper surface of the first medium 8. As illustrated in FIG. 6B, in the case where the user sticks the sticking portion of the second medium 9 to the surface of the first medium 8 and then sticks the medium 99 to the object in the state in which the second medium 9 is located on the upper surface of the first medium 8, the sticking portion of the second medium 9 faces downward, a step portion of the second medium 9 in the thickness direction faces downward. This configuration makes it difficult for foreign matters, such as dust, an agent, and water, to accumulate on the sticking portion of the medium 99, thereby reducing deterioration of the image printed on the medium 99 and reducing a phenomenon (floating) in which the second medium 9 partly comes off from the first medium 8 at the sticking portion.

The image 42 is disposed between the center M2 of the second medium 9 in the widthwise direction 17 and the other end 94 of the second medium 9 in the widthwise direction 17. As illustrated in FIG. 6B, in the case where the sticking portion of the second medium 9 is stuck to the first medium 8, and the medium 99 is stuck to the object in the state in which the second medium 9 is located on the upper surface of the first medium 8, the image 42 can be disposed on the top of the medium 99.

The tape roll 600 includes the spool 72 and the tape 60 wound around the spool 72. Thus, the tape 60 is held by the spool 72 so as to be made compact. In each pair of the first medium 8 and the second medium 9, the second medium 9 is farther from the spool 72 provided for the tape roll 600 than the first medium 8. Printing is performed in the order of the second medium 9 and the first medium 8. In the tape roll 600, the user can peel off the sheet 7 from the sticking portion of the second medium 9 at the completion of printing on the second medium 9 before printing on the first medium 8 and the second medium 9 is finished.

The tape cassette 6 includes the tape roll 600, the ribbon roll 20, the housing 670, the opening 79, and the output portion 64. The ribbon roll 20 is the roll of the ink ribbon 613 to be used for printing on the tape 60. The housing 670 contains the tape roll 600 and the ribbon roll 20. The opening 79 exposes the ink ribbon 613 and the tape 60 to the outside of the housing 670. The tape 60 exposed from the opening 79 to the outside of the housing 670 is passed through the output portion 64. The length L between the opening 79 and the output portion 64 is less than the distance D1 between two of the plurality of pairs of the first media 8 and the second media 9, which two are adjacent to each other in the longitudinal direction 16 of the sheet 7. The tape cassette 6 is installed on the printing apparatus 1 including the cutters (the movable blade 141 and the fixed blade 142) provided adjacent to the output portion 64. An end portion of the second medium 9 of the next pair of the second medium 9 and the first medium 8 is located in the housing 670 at the point in time when the tape 60 is cut after printing. That is, the end portion of the second medium 9 is located upstream, in the conveying direction, of a printing position opposed to the thermal head 29. The upstream side in the conveying direction is the same as a spool-side in the longitudinal direction 16.

The tape cassette 6 includes the tape roll 600, the ribbon roll 20, and the housing 670. The tape roll 600 is the roll of the tape 60 wound around the spool 72. The ribbon roll 20 is the roll of the ink ribbon 613 to be used for printing on the tape 60. The housing 670 contains the tape roll 600 and the ribbon roll 20. The second medium 9 of the tape 60 includes the image 42 formed in a first color. The ink ribbon 613 has ink of a second color different from the first color. Accordingly, an image formed in the first and second colors can be formed on the medium 99 including the first medium 8 and the second medium 9 stuck to each other.

Modifications

While the embodiment has been described above, it is to be understood that the disclosure is not limited to the details of the illustrated embodiment, but may be embodied with various changes and modifications, which may occur to those skilled in the art, without departing from the spirit and scope of the disclosure. For example, the following modifications may be made. It is noted that the same reference numerals as used in the above-described embodiment are used to designate the corresponding elements of the modifications.

The shape, size, color, and so on of the first medium and the second medium may be changed as needed. For example, the second medium may not include an image extending in the longitudinal direction of the tape. In a modification, specifically, as illustrated in FIG. 7A, a tape 61 may include the sheet 7 and a plurality of pairs of the first media 8. In each pair, the two first media 8 have the same shape and each does not have an image. The sheet 7 includes the first separating line 44 and the second separating line 43. The first separating line 44 extends in the widthwise direction 17 at a portion of the sheet 7 between the two first media 8 of the same pair 80. In another example, the first medium and the second medium in the above-described embodiment may not have the same shape and may not have the same length in the longitudinal direction of the sheet. In still another example, each of the first medium and the second medium may have a semicircular shape such that the first medium and the second medium stuck to each other constitute a circular medium.

The configuration of the sheet may be changed as needed. In another modification, as illustrated in FIG. 7B, a tape 67 may include a sheet 90 and a plurality of pairs of the first medium 8 and the second medium 9. The sheet 90 does not include the first separating line 44 but includes the second separating line 43. In this configuration, the user may operates the cutting knob 14 between the first medium 8 and the second medium 9 of the same pair to cut the sheet 7 in the widthwise direction 17 between the first medium 8 and the second medium 9. The length L between the opening 79 and the output portion 64 illustrated in FIG. 4 may be greater than the distance D3 between two of the plurality of pairs of the first media 8 and the second media 9 illustrated in FIG. 7B, which two are adjacent to each other in the longitudinal direction 16 of the sheet 7.

Another medium may be disposed between adjacent two of a plurality of pairs of the first media 8 and the second media 9. For example, in still another modification, as illustrated in FIG. 7C, a tape 68 may include at least one third medium 50 such as a round medium 51, a triangle medium 52, and a rhombus medium 53. The third medium 50 is disposed between the two pairs of the first media 8 and the second media 9 adjacent to each other in the longitudinal direction 16 of the sheet 7. The color of the third medium 50 may be different from that of the first medium 8 and the second medium 9 and from that of the ink ribbon 613. In the tape 68 according to this modification, the first medium 8, the second medium 9, and the third medium 50 may be combined with one another to create a printing medium satisfying standards (e.g., ANSIZ535 and IEC60417) of a printing medium representing warning.

Figure 8A:
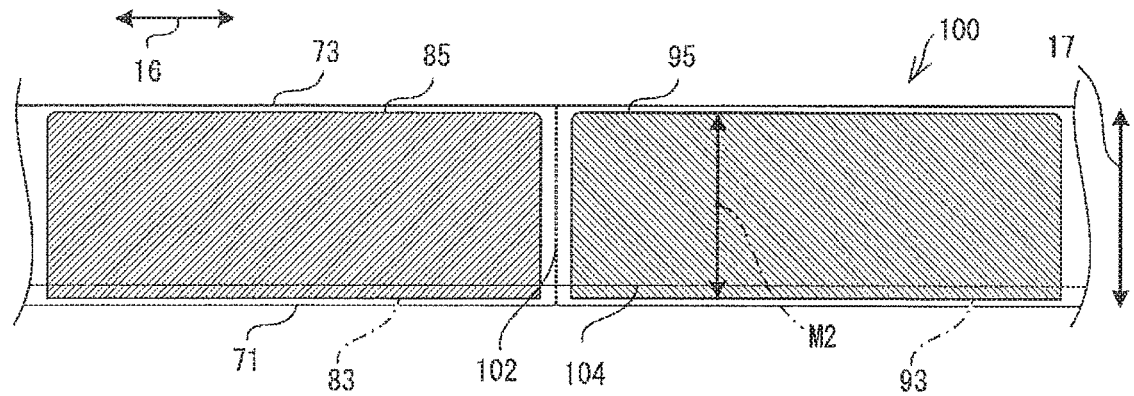
FIGS. 8A through 8D are views of sheets of tapes in still other modifications, each illustrating a portion of the sheet to which the first medium had been stuck and a portion of the sheet to which the second medium had been stuck, in the case where the first medium and the second medium are peeled off.

Arrangement of the first medium and the second medium on the sheet may be changed as needed. For example, in still another modification, a tape 89 illustrated in FIG. 7D is configured such that the orientations of the first medium 8 and the second medium 9 having the same shape are different from each other in the widthwise direction 17. In this configuration, the image 86 printed on the first medium 8 and the image 96 printed on the second medium 9 may not be oriented in opposite directions, respectively. For example, in still another modification, as illustrated in FIG. 8A, one end 71 of a sheet 100 in the widthwise direction 17 is farther from the center M2 of the second medium 9 in the widthwise direction 17 than the one end 83 of the first medium 8 in the widthwise direction 17 and the one end 93 of the second medium 9 in the widthwise direction 17. That is, the one end 83 of the first medium 8 in the widthwise direction 17 and the one end 93 of the second medium 9 in the widthwise direction 17 are not located at the same position in the widthwise direction 17 as that of the one end 71 of the sheet 100 in the widthwise direction 17. A first separating line 102 extends to the one end 71 of the sheet 7 in the widthwise direction 17. In the case where borderless printing is performed on the medium, the printing position in the widthwise direction 17 in some cases deviates from an appropriate position, and an image is partly printed on the outside of the one ends 83, 93 of the respective media 8, 9 in the widthwise direction 17. In the present modification, even in these cases, the protruding portion of the image is printed on the sheet 100 if possible, causing no damage to the printing apparatus 1. A second separating line 104 is nearer to the other end 73 of the sheet 100 in the widthwise direction 17 than the second separating line 43 in the above-described embodiment. In another example, the first medium 8 may be farther from the spool 72 than the second medium 9 in the first medium 8 and the second medium 9 of the same pair.

Figure 8B:
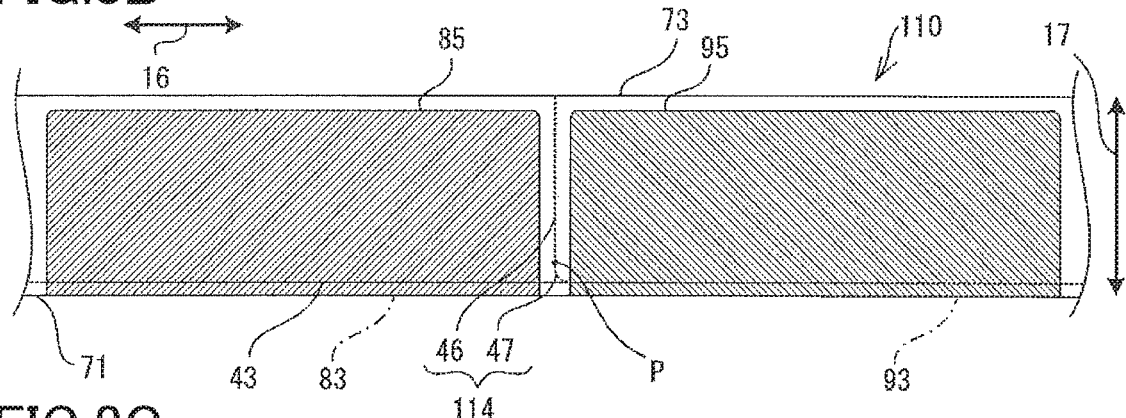
Figure 8C:
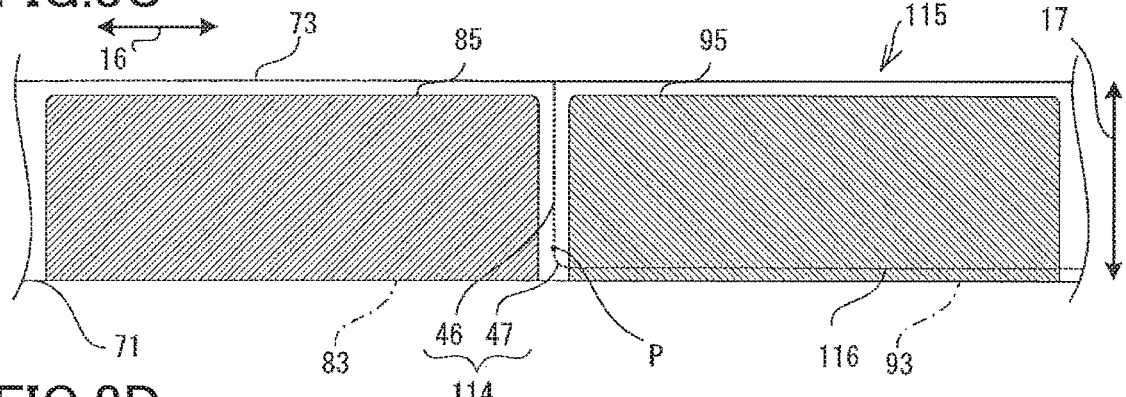

The shape of the first separating line and a region at which the first separating line is provided may be changed as needed. In still other modification, for example, a sheet 110 in FIG. 8B, a sheet 115 in FIG. 8C, and a sheet 118 in FIG. 8D includes a first separating line 114 having a first portion 46 and a second portion 47. In each of the sheets 110, 115, 118, the first portion 46 extends parallel with the widthwise direction 17 from the other end 73 of the sheet in the widthwise direction 17 to a particular position P that is nearer to a corresponding one of the second separating line 43 and a second separating line 116 than the other end 73 of the sheet in the widthwise direction 17. The second portion 47 extends from the particular position P to the second separating line 43 in a direction directed toward the second medium 9. In the present example, the second portion 47 has an arc shape. The second portion 47 may a straight line. In the case where the first separating line and the second separating line are orthogonal to each other, when the user separates the sheet along the first separating line and the second separating line, stress concentrates on a portion of the sheet at which the first separating line and the second separating line intersect each other, whereby the sheet is easily torn off toward the one end of the sheet in the widthwise direction. In the present modifications, however, the second portion reduces the stress concentration at the portion at which the first separating line and the second separating line are connected to each other, making it difficult for the sheet to be torn off when the sheet is separated along the first separating line and the second separating line. That is, in the tape including any of the sheets 110, 115, 118, the user separates the sheet along the first separating line 114 and the second separating line 43 or 116, which facilitates peeling off the portion 95 of the sheet from the second medium 9 in a state in which a portion of the sheet which is located between the second separating line 43 or 116 and the one end 71 is continuous to the portion of the sheet to which the first medium 8 is stuck. In still another modification, the first separating line may not extend to the one end and the other end of the sheet 7. In the above-described embodiment, as illustrated in FIGS. 5A-5D, the first separating line 44 extends to the other end 73 of the sheet 7 in the widthwise direction but does not extend to the one end 71 of the sheet 7. That is, the first separating line at least needs to extend in the widthwise direction over at least a portion of the sheet between the one end and the other end in the widthwise direction. Accordingly, for example, the first separating line may extend to the one end 71 of the sheet 7 in the widthwise direction but not extend to the other end 73 of the sheet 7 and may not extend to the one end 71 of the sheet 7 and not extend to the other end 73 of the sheet 7. As long as the portion of the sheet to which the first medium is stuck and the portion of the sheet to which the second medium is stuck are separable from each other, the region at which the first separating line is provided need not extend to opposite end portions of the sheet in the widthwise direction.

A region at which the second separating line is provided in the longitudinal direction of the tape may be changed as needed. For example, in each of the sheet 115 in FIG. 8C and the sheet 118 in FIG. 8D, the second separating line 116 extends through the sheet 7 except for portions of the sheet 7 to which the first media 8 are stuck. Thus, when the user separates the portion 95 of the sheet to which the second medium 9 is stuck, along the second separating line 116, it is difficult to peel off the portion 85 of the sheet to which the first medium 8 is stuck. Accordingly, when the portion 95 of the sheet to which the second medium 9 is stuck is peeled off, the number of portions of the sheet to be peeled off is small when compared with a case where the user peels off the portion 85 of the sheet to which the first medium 8 is stuck. In still another modification, the second separating line may not extend to the first separating line. That is, the second separating line at least needs to be formed at least over the portion of the sheet to which the second medium is stuck. For example, in FIG. 8A, the region at which the second separating line 104 is provided in the longitudinal direction may only extend from one end of the portion 95 in the longitudinal direction to which the second medium is stuck (i.e., an end portion of the sheet which corresponds to the one end 91 of the second medium 9), to the other end of the portion 95 in the longitudinal direction (i.e., an end portion of the sheet which corresponds to the other end 92 of the second medium 9). In this configuration, there is a portion of the sheet which is located between an end portion of the first separating line 102 and an end portion of the second separating line 104 and at which the second separating line 104 does not extend to the first separating line 102, and the first separating line 102 and the second separating line 104 are not formed. However, the user may peel off the partial sheet 75 from the second medium 9 by breaking the portion of the sheet at which the separating line is not formed. Since the portion of the sheet at which the second separating line 104 and the first separating line 102 are not formed is not covered with the first medium and the second medium, it is possible for the user to break the portion of the sheet.

Each of the first separating line and the second separating line at least needs to have a portion of the sheet which is cut in the thickness direction or through which holes or the like is formed in the thickness direction. Each of the first separating line and the second separating line may have a portion of the sheet which is cut in the thickness direction of the sheet without extending through the sheet in its thickness direction. The portion cut in the thickness direction of the sheet may be a recess having a V-shape or a U-shape in cross section in the thickness direction or a line extending in the thickness direction, for example. The portion cut in the thickness direction of the sheet may be provided on a front surface or a back surface of the sheet.

Figure 8D:
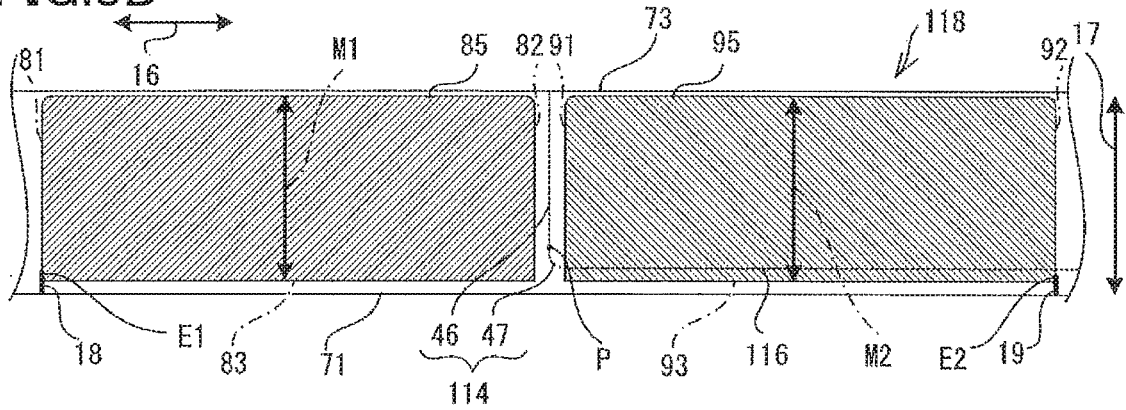

The tape may be configured such that positioning can be made in sticking. For example, as illustrated in FIG. 8D, the sheet 118 may have a first cutting portion 18 and a second cutting portion 19. The first cutting portion 18 is formed through the sheet 118 at a portion of the sheet 118 which is farther from the other end 82 of the first medium 8 in the longitudinal direction 16 than the one end 81 of the first medium 8 in the longitudinal direction 16. The first cutting portion 18 extends to a first endpoint E1 between the one end 71 of the sheet 118 in the widthwise direction 17 and the center M6 of the first medium 8 in the widthwise direction 17. The one end 81 of the first medium 8 in the longitudinal direction 16 is nearer to one end of the sheet 118 in the longitudinal direction 16 than the center of the first medium 8 in the longitudinal direction 16. The first cutting portion 18 extends from the one end 71 of the sheet 118 to the first endpoint E1 in the widthwise direction 17. The first endpoint E1 is located in the widthwise direction 17 between the one end 71 and the center M1 of the first medium 8 in the widthwise direction 17. The first cutting portion 18 is formed through the sheet 118. The second cutting portion 19 is formed through the sheet 118 at a portion of the sheet 118 which is farther from the one end 91 of the second medium 9 in the longitudinal direction 16 than the other end 92 of the second medium 9 in the longitudinal direction 16. The second cutting portion 19 extends from the one end 71 of the sheet 118 to a second endpoint E2 in the widthwise direction 17. The second endpoint E2 is located in the widthwise direction 17 between the one end 71 and the center M2 of the second medium 9 in the widthwise direction 17. The second cutting portion 19 is located at such a position that the first cutting portion 18 and the second endpoint E2 in the longitudinal direction 16 of the sheet 118 are equidistant from the center of the first medium 8 and the second medium 9 of the same pair in the longitudinal direction 16 of the sheet 118. That is, the distance from the first portion 46 of the first separating line 114 to the first endpoint E1 is equal to the distance from the first portion 46 of the first separating line 114 to the second endpoint E2. In the tape including the sheet 118, in the case where an original image wider than the medium is printed on the medium such that the original image is split into a plurality of portions each having a width less than or equal to the width of the medium, the first cutting portion 18 and the second cutting portion 19 are aligned to each other to accurately position the first medium and the second medium to each other in the longitudinal direction 16 in sticking. The sum of the distance from the one end 83 of the first medium 8 to the first endpoint E1 in the widthwise direction 17 and the distance from the one end 93 of the second medium 9 to the second endpoint E2 in the widthwise direction 17 is preferably equal to the distance from the one end 93 of the second medium 9 to the second separating line 116 in the widthwise direction 17. More preferably, each of the distance from the one end 83 of the first medium 8 to the first endpoint E1 in the widthwise direction 17 and the distance from the one end 93 of the second medium 9 to the second endpoint E2 in the widthwise direction 17 is preferably a half the distance from the one end 93 of the second medium 9 to the second separating line 116 in the widthwise direction 17. In the case where the endpoints E1, E2 are located in this manner, the first cutting portion 18 and the second cutting portion 19 are aligned to each other such that the endpoints E1, E2 are brought into contact with each other, whereby the first medium 8 and the second medium 9 are positioned to each other also in the widthwise direction 17 in sticking.

The tape may not be wound around the spool. The tape roll may not be installed on the cassette. The configurations of the tape cassette and the printing apparatus on which the tape cassette is installed may be changed as needed. No printing may be performed on the first medium and the second medium of the tape. The color, the material, and so on of the first medium, the second medium, and the ink of the ink ribbon may be changed as needed. The above-described embodiment and the modifications may be combined as needed. The method of manufacturing the tape may be changed as needed. A portion of the medium having the same shape as that of the sheet, which portion is different from the first media and the second media, may be partly or entirely kept stuck to the sheet. In this case, a step of peeling off the portion of the medium which is different from the first media 8 and the second media 9 may be omitted as needed.

What is claimed is:

1. A tape, comprising:
a sheet having a strip shape;
a first medium and a second medium arranged adjacent to each other in a longitudinal direction of the sheet, the first medium and the second medium being spaced apart from each other in the longitudinal direction, the first medium and the second medium being peelably adhered to the sheet;
a first separating line formed at a portion of the sheet which is located between the first medium and the second medium arranged in the longitudinal direction as a pair, the first separating line extending, in a widthwise direction orthogonal to the longitudinal direction, over at least a portion of a region extending in the widthwise direction from a first end of the sheet in the widthwise direction to a second end of the sheet in the widthwise direction, the first separating line comprising a portion formed through or cut in the sheet in a thickness direction of the sheet; and
a second separating line formed at a portion of the sheet which is located in the widthwise direction between a center position of the second medium in the widthwise direction and a first end of the second medium which is nearer in the widthwise direction to the first end of the sheet than the center position of the second medium in the widthwise direction, the second separating line being formed at at least a portion of the sheet to which the second medium adheres and which is located between a first end of the second medium in the longitudinal direction and a second end of the second medium in the longitudinal direction, the second separating line comprising a portion formed through or cut in the sheet in the thickness direction,
wherein the first separating line extends in the widthwise direction from the second separating line to the second end of the sheet in the widthwise direction and does not extend in the widthwise direction between the second separating line and the first end of the sheet in the widthwise direction, and
wherein the first medium comprises a first printed region on which a first image is printed, and the second medium comprises a second printed region on which a second image is printed, the first image and the second image being formed by dividing an original image having a length greater than that of the first medium and the second medium in the widthwise direction, the first image and the second image being printed such that the first image and the second image are respectively oriented in opposite directions.

2. The tape according to claim 1, wherein the second separating line extends in a direction parallel with the longitudinal direction of the sheet.

3. The tape according to claim 1,
wherein the first medium is located nearer to a first end of the sheet in the longitudinal direction than the second medium in the pair of the first medium and the second medium, and
wherein, in the pair of the first medium and the second medium, the second separating line at least extends between a first end of the first medium in the longitudinal direction and the second end of the second medium in the longitudinal direction in a portion of the sheet which comprises: the portion of the sheet to which the second medium adheres; and a portion of the sheet to which the first medium adheres.

4. The tape according to claim 1, wherein the first separating line comprises:
- a first portion extending, in a direction parallel with the widthwise direction, from the second end of the sheet in the widthwise direction to a particular position nearer to the second separating line than the second end of the sheet in the widthwise direction; and
- a second portion extending from the particular position to the second separating line in a direction toward the second medium.

5. The tape according to claim 1, wherein the second separating line is located in the widthwise direction at a distance of greater than or equal to 3 mm from the first end of the sheet in the widthwise direction.

6. The tape according to claim 1, wherein the second separating line is formed so as to avoid a portion of the sheet to which the first medium adheres.

7. The tape according to claim 1, wherein the second medium comprises an image extending in the longitudinal direction and at least formed in a first color different from a ground color of the second medium.

8. The tape according to claim 7, wherein the image is located between the center position of the second medium in the widthwise direction and a second end of the second medium in the widthwise direction.

9. The tape according to claim 1, further comprising:
- a plurality of pairs of first media and second media each as the pair of the first medium and the second medium; and
- a third medium having one of a round shape, triangular shape, or a rhombus shape and located between two of the plurality of the pairs of the first media and the second media in the longitudinal direction of the sheet.

10. The tape according to claim 1,
wherein the first medium is nearer to a first end of the sheet in the longitudinal direction than the second medium in the pair of the first medium and the second medium,
wherein the tape further comprises:
- a first cutting portion formed through the sheet at a portion of the sheet which is farther from a second end of the first medium in the longitudinal direction than a first end of the first medium in the longitudinal direction, the first cutting portion extending from the first end of the sheet in the widthwise direction to a first endpoint located between the first end of the sheet in the widthwise direction and a center position of the first medium in the widthwise direction; and
- a second cutting portion formed through the sheet at a portion of the sheet which is farther from the first end of the second medium in the longitudinal direction than the second end of the second medium in the longitudinal direction, the second cutting portion extending from the first end of the sheet in the widthwise direction to a second endpoint located between the first end of the sheet in the widthwise direction and the center position of the second medium in the widthwise direction, and wherein the first cutting portion and the second endpoint in the longitudinal direction of the sheet are equidistant from a center position of a portion of the sheet in the longitudinal direction, which portion is located between the first medium and the second medium.

11. A tape, comprising:
- a sheet having a strip shape;
- a plurality of media consecutively arranged so as to be spaced apart from each other in a longitudinal direction of the sheet, the plurality of media being peelably adhered to the sheet;
- a first separating line formed at a portion of the sheet which is located between two adjacent media of the plurality of media, the first separating line extending, in a widthwise direction orthogonal to the longitudinal direction, over at least a portion of a region extending in the widthwise direction from a first end of the sheet in the widthwise direction to a second end of the sheet in the widthwise direction, the first separating line comprising a portion formed through or cut in the sheet in a thickness direction of the sheet; and
- a second separating line formed at a portion of the sheet which is located in the widthwise direction between a center position of one medium of the two adjacent media in the widthwise direction and a first end of the one medium in the widthwise direction, the second separating line being formed at at least a portion of the sheet to which the one medium adheres and which is located between a first end of the one medium in the longitudinal direction and a second end of the one medium in the longitudinal direction, the second separating line comprising a portion formed through or cut in the sheet in the thickness direction, wherein the first separating line extends in the widthwise direction from the second separating line to the second end of the sheet in the widthwise direction and does not extend in the widthwise direction between the second separating line and the first end of the sheet in the widthwise direction, and wherein one of the two adjacent media comprises a first printed region on which a first image is printed, and the other of the two adjacent media comprises a second printed region on which a second image is printed, the first image and the second image being formed by dividing an original image having a length greater than that of the one of the two adjacent media and the other of the two adjacent media in the widthwise direction, the first image and the second image being printed such that the first image and the second image are respectively oriented in opposite directions.

12. A tape roll, comprising:
- a spool; and
- a tape wound around the spool, the tape comprising:
  - a sheet having a strip shape;
  - a first medium and a second medium arranged adjacent to each other in a longitudinal direction of the sheet, the first medium and the second medium being spaced apart from each other in the longitudinal direction, the first medium and the second medium being peelably adhered to the sheet;
  - a first separating line formed at a portion of the sheet which is located between the first medium and the second medium arranged in the longitudinal direction as a pair, the first separating line extending, in a widthwise direction orthogonal to the longitudinal direction, over at least a portion of a region extending in the widthwise direction from a first end of the sheet in the widthwise direction to a second end of the sheet in the widthwise direction, the first separating line comprising a portion formed through or cut in the sheet in a thickness direction of the sheet; and
  - a second separating line formed at a portion of the sheet which is located in the widthwise direction between a center position of the second medium in the widthwise direction and a first end of the second medium which is nearer in the widthwise direction to the first end of the sheet than the center position of the second medium in the widthwise direction, the second separating line being formed at at least a portion of the sheet to which the second medium adheres and which is located between a first end of the second medium in the longitudinal direction and a second end of the second medium in the longitudinal direction, the second separating line comprising a portion formed through or cut in the sheet in the thickness direction, wherein the first separating line extends in the widthwise direction from the second separating line to the second end of the sheet in the widthwise direction and does not extend in the widthwise direction between the second separating line and the first end of the sheet in the widthwise direction, and wherein the first medium comprises a first printed region on which a first image is printed, and the second medium comprises a second printed region on which a second image is printed, the first image and the second image being formed by dividing an original image having a length greater than that of the first medium and the second medium in the widthwise direction, the first image and the second image being printed such that the first image and the second image are respectively oriented in opposite directions.

13. A tape roll, comprising:

a spool; and a tape wound around the spool, the tape comprising:
  a sheet having a strip shape;
  a first medium and a second medium arranged adjacent to each other in a longitudinal direction of the sheet, the first medium and the second medium being spaced apart from each other in the longitudinal direction, the first medium and the second medium being peelably adhered to the sheet;
  a first separating line formed at a portion of the sheet which is located between the first medium and the second medium arranged in the longitudinal direction as a pair, the first separating line extending, in a widthwise direction orthogonal to the longitudinal direction, over at least a portion of a region extending in the widthwise direction from a first end of the sheet in the widthwise direction to a second end of the sheet in the widthwise direction, the first separating line comprising a portion formed through or cut in the sheet in a thickness direction of the sheet; and
  a second separating line formed at a portion of the sheet which is located in the widthwise direction between a center position of the second medium in the widthwise direction and a first end of the second medium which is nearer in the widthwise direction to the first end of the sheet than the center position of the second medium in the widthwise direction, the second separating line being formed at at least a portion of the sheet to which the second medium adheres and which is located between a first end of the second medium in the longitudinal direction and a second end of the second medium in the longitudinal direction, the second separating line comprising a portion formed through or cut in the sheet in the thickness direction, wherein the second medium is located on one of opposite end portions of the tape roll, which one is farther from the spool than the other, in the pair of the first medium and the second medium, wherein the first separating line extends in the widthwise direction from the second separating line to the second end of the sheet in the widthwise direction and does not extend in the widthwise direction between the second separating line and the first end of the sheet in the widthwise direction, and wherein the first medium comprises a first printed region on which a first image is printed, and the second medium comprises a second printed region on which a second image is printed, the first image and the second image being formed by dividing an original image having a length greater than that of the first medium and the second medium in the widthwise direction, the first image and the second image being printed such that the first image and the second image are respectively oriented in opposite directions.

14. A tape cassette, comprising:

a tape roll comprising (a) a spool and (b) a tape wound around the spool, the tape comprising (i) a sheet having a strip shape, (ii) a first medium and a second medium arranged adjacent to each other in a longitudinal direction of the sheet, the first medium and the second medium being spaced apart from each other in the longitudinal direction, the first medium and the second medium being peelably adhered to the sheet, (iii) a first separating line formed at a portion of the sheet which is located between the first medium and the second medium arranged in the longitudinal direction as a pair, the first separating line extending, in a widthwise direction orthogonal to the longitudinal direction, over at least a portion of a region extending in the widthwise direction from a first end of the sheet in the widthwise direction to a second end of the sheet in the widthwise direction, the first separating line comprising a portion formed through or cut in the sheet in a thickness direction of the sheet, and (iv) a second separating line formed at a portion of the sheet which is located in the widthwise direction between a center position of the second medium in the widthwise direction and a first end of the second medium which is nearer in the widthwise direction to the first end of the sheet than the center position of the second medium in the widthwise direction, the second separating line being formed at at least a portion of the sheet to which the second medium adheres and which is located between a first end of the second medium in the longitudinal direction and a second end of the second medium in the longitudinal direction, the second separating line comprising a portion formed through or cut in the sheet in the thickness direction, wherein the second medium is located on one of opposite end portions of the tape roll, which one is farther from the spool than the other, in the pair of the first medium and the second medium;

a ribbon roll that is a roll of ink ribbon to be used for printing on the tape roll;

a housing that houses the tape roll and the ribbon roll;

an opening that exposes the ink ribbon and the tape to outside of the housing; and an output portion through which the tape exposed to the outside of the housing through the opening is to be passed, wherein the tape further comprises a plurality of pairs of first media and second media each as the pair of the first medium and the second medium, wherein a length between the opening and the output portion is less than a distance between two pairs of the plurality of the pairs of the first media and the second media, which two pairs are adjacent to each other in the longitudinal direction, wherein the first separating line extends in the widthwise direction from the second separating line to the second end of the sheet in the widthwise direction and does not extend in the widthwise direction between the second separating line and the first end of the sheet in the widthwise direction, and wherein the first medium comprises a first printed region on which a first image is printed, and the second medium comprises a second printed region on which a second image is printed, the first image and the second image being formed by dividing an original image having a length greater than that of the first medium and the second medium in the widthwise direction, the first image and the second image being printed such that the first image and the second image are respectively oriented in opposite directions.

15. A tape cassette, comprising:

a tape roll that is a roll of a tape wound around a spool, the tape comprising (i) a sheet having a strip shape, (ii) a first medium and a second medium arranged adjacent to each other in a longitudinal direction of the sheet, the first medium and the second medium being spaced apart from each other in the longitudinal direction, the first medium and the second medium being peelably adhered to the sheet, (iii) a first separating line formed at a portion of the sheet which is located between the first medium and the second medium arranged in the longitudinal direction as a pair, the first separating line extending, in a widthwise direction orthogonal to the longitudinal direction, over at least a portion of a region extending in the widthwise direction from a first end of the sheet in the widthwise direction to a second end of the sheet in the widthwise direction, the first separating line comprising a portion formed through or cut in the sheet in a thickness direction of the sheet, (iv) a second separating line formed at a portion of the sheet which is located in the widthwise direction between a center position of the second medium in the widthwise direction and a first end of the second medium which is nearer in the widthwise direction to the first end of the sheet than the center position of the second medium in the widthwise direction, the second separating line being formed at at least a portion of the sheet to which the second medium adheres and which is located between a first end of the second medium in the longitudinal direction and a second end of the second medium in the longitudinal direction, the second separating line comprising a portion formed through or cut in the sheet in the thickness direction, the second medium comprising an image extending in the longitudinal direction and at least formed in a first color different from a ground color of the second medium;

a ribbon roll that is a roll of ink ribbon to be used for printing on the tape roll; and a housing that houses the tape roll and the ribbon roll, wherein the ink ribbon comprises ink of a second color different from the first color, wherein the first separating line extends in the widthwise direction from the second separating line to the second end of the sheet in the widthwise direction and does not extend in the widthwise direction between the second separating line and the first end of the sheet in the widthwise direction, and wherein the first medium comprises a first printed region on which a first image is printed, and the second medium comprises a second printed region on which a second image is printed, the first image and the second image being formed by dividing an original image having a length greater than that of the first medium and the second medium in the widthwise direction, the first image and the second image being printed such that the first image and the second image are respectively oriented in opposite directions.

\* \* \* \* \*